US011832218B2

(12) United States Patent
Xue et al.

(10) Patent No.: US 11,832,218 B2
(45) Date of Patent: Nov. 28, 2023

(54) RESERVATION TECHNIQUES FOR AGGREGATED SIDELINK COMMUNICATIONS

(71) Applicant: QUALCOMM Incorporated, San Diego, CA (US)

(72) Inventors: Yisheng Xue, San Diego, CA (US); Chih-Hao Liu, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 222 days.

(21) Appl. No.: 17/387,891

(22) Filed: Jul. 28, 2021

(65) Prior Publication Data

US 2023/0030900 A1 Feb. 2, 2023

(51) Int. Cl.
*H04W 4/70* (2018.01)
*H04W 92/18* (2009.01)
(Continued)

(52) U.S. Cl.
CPC ............ *H04W 72/02* (2013.01); *H04W 4/70* (2018.02); *H04W 28/26* (2013.01);
(Continued)

(58) Field of Classification Search
CPC . H04W 72/02; H04W 28/26; H04W 72/0446; H04W 92/18; H04W 4/40; H04W 76/14
See application file for complete search history.

(56) References Cited

U.S. PATENT DOCUMENTS

2021/0037503 A1  2/2021  Nam et al.
2022/0279496 A1* 9/2022  Hahn ............... H04W 4/40
2022/0330261 A1* 10/2022 Yeo ............... H04L 5/0053

FOREIGN PATENT DOCUMENTS

WO  WO-2021060936 A1  4/2021

OTHER PUBLICATIONS

3GPP TS 38.331: "3rd Generation Partnership Project, Technical Specification Group Radio Access Network, NR, Radio Resource Control (RRC) Protocol Specification (Release 16)", 3GPP Standard, Technical Specification, 3rd Generation Partnership Project, Mobile Competence Centre, 650, Route Des Lucioles, F-06921 Sophia-Antipolis Cedex, France, Jul. 6, 2021, pp. 1-959, XP052030220, p. 448-p. 469.
(Continued)

*Primary Examiner* — Faruk Hamza
*Assistant Examiner* — Aixa A Guadalupe Cruz
(74) *Attorney, Agent, or Firm* — Holland & Hart LLP/Qualcomm Incorporated

(57) ABSTRACT

Methods, systems, and devices for wireless communications are described. A user equipment (UE) may receive control signaling indicating an aggregated sidelink resource reservation rule for reserving time-contiguous transmission time intervals. The UE may transmit a sidelink control reservation message based on the aggregated sidelink resource reservation rule. The sidelink control reservation message may indicate a starting transmission time interval for reserving a set of time-contiguous transmission time intervals in a sidelink shared channel. Additionally or alternatively, the sidelink control reservation message may indicate a quantity of the set of time-contiguous transmission time intervals reserved for transmission of a set of aggregated sidelink messages. The UE may transmit the set of aggregated sidelink messages via the set of time-contiguous transmis-
(Continued)

sion time intervals of the sidelink shared channel indicated in the sidelink control reservation message.

30 Claims, 15 Drawing Sheets

(51) Int. Cl.
*H04W 72/02* (2009.01)
*H04W 28/26* (2009.01)
*H04W 72/0446* (2023.01)
*H04W 4/46* (2018.01)

(52) U.S. Cl.
CPC .......... *H04W 72/0446* (2013.01); *H04W 4/46* (2018.02); *H04W 92/18* (2013.01)

(56) References Cited

OTHER PUBLICATIONS

International Search Report and Written Opinion—PCT/US2022/035307—ISA/EPO—dated Oct. 27, 2022.

\* cited by examiner

RESERVATION TECHNIQUES FOR AGGREGATED SIDELINK COMMUNICATIONS

FIELD OF TECHNOLOGY

The following relates to wireless communications, including reservation techniques for aggregated sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support sidelink communications between multiple UEs. For example, a UE may perform a sidelink resource selection procedure to identify available sidelink resources. The UE may reserve some of the available sidelink resources for transmission of a sidelink message to another UE.

SUMMARY

The described techniques relate to improved methods, systems, devices, and apparatuses that support reservation techniques for aggregated sidelink communications. Generally, the described techniques provide for an indication of a set of aggregated sidelink messages, such as a start-length-indicator-value (SLIV) included in a sidelink control reservation message. For example, a user equipment (UE) may identify data for transmission over a set of aggregated transmission time intervals (TTIs) (e.g., a set of slots). That is, the UE may attempt to reserve sidelink resources (e.g., a set of contiguous TTIs) for communication of a set of aggregated data messages. The UE may identify an aggregated sidelink resource reservation rule for reserving the sidelink resources for the set of aggregated data messages. For example, the UE may receive control signaling indicating the rule, the UE may be pre-configured with the rule, or a combination thereof. Based on the sidelink resource reservation rule, the UE may transmit a sidelink control reservation message indicating the set of aggregated data messages. For example, the UE may transmit sidelink control information with an indication of a length, start, or both of a burst of sidelink messages (e.g., a SLIV). Additionally or alternatively, the UE may transmit multiple (e.g., two) reservation messages, where a first reservation message indicates resources of a first message of the burst of sidelink messages and a second reservation message indicates resources of a second message (e.g., a last message or an initial message) of the burst of sidelink messages. Such techniques may enable the UE to reserve multiple TTIs of a sidelink channel with a resource reservation message, which may result in reduced interference, improved communications efficiency, or both, among other benefits.

A method for wireless communications at a user equipment (UE) is described. The method may include receiving control signaling indicating an aggregated sidelink resource reservation rule for reserving time-contiguous TTIs, transmitting, based on the aggregated sidelink resource reservation rule, a sidelink control reservation message indicating a starting TTI for reserving a set of multiple time-contiguous TTIs in a sidelink shared channel and a quantity of the set of multiple time-contiguous TTIs reserved for transmission of a set of multiple aggregated sidelink messages, and transmitting the set of multiple aggregated sidelink messages via the set of multiple time-contiguous TTI of the sidelink shared channel indicated in the sidelink control reservation message.

An apparatus for wireless communications at a UE is described. The apparatus may include a processor, memory coupled with the processor, and instructions stored in the memory. The instructions may be executable by the processor to cause the apparatus to receive control signaling indicating an aggregated sidelink resource reservation rule for reserving time-contiguous TTIs, transmit, based on the aggregated sidelink resource reservation rule, a sidelink control reservation message indicating a starting TTI for reserving a set of multiple time-contiguous TTIs in a sidelink shared channel and a quantity of the set of multiple time-contiguous TTIs reserved for transmission of a set of multiple aggregated sidelink messages, and transmit the set of multiple aggregated sidelink messages via the set of multiple time-contiguous TTIs of the sidelink shared channel indicated in the sidelink control reservation message.

Another apparatus for wireless communications at a UE is described. The apparatus may include means for receiving control signaling indicating an aggregated sidelink resource reservation rule for reserving time-contiguous TTIs, means for transmitting, based on the aggregated sidelink resource reservation rule, a sidelink control reservation message indicating a starting TTI for reserving a set of multiple time-contiguous TTIs in a sidelink shared channel and a quantity of the set of multiple time-contiguous TTIs reserved for transmission of a set of multiple aggregated sidelink messages, and means for transmitting the set of multiple aggregated sidelink messages via the set of multiple time-contiguous TTIs of the sidelink shared channel indicated in the sidelink control reservation message.

A non-transitory computer-readable medium storing code for wireless communications at a UE is described. The code may include instructions executable by a processor to receive control signaling indicating an aggregated sidelink resource reservation rule for reserving time-contiguous TTIs, transmit, based on the aggregated sidelink resource reservation rule, a sidelink control reservation message indicating a starting TTI for reserving a set of multiple time-contiguous TTIs in a sidelink shared channel and a quantity of the set of multiple time-contiguous TTIs reserved for transmission of a set of multiple aggregated sidelink messages, and transmit the set of multiple aggregated sidelink messages via the set of multiple time-contiguous TTIs of the sidelink shared channel indicated in the sidelink control reservation message.

Some examples of the method, apparatuses, and non-transitory computer-readable medium described herein may further include operations, features, means, or instructions for receiving control signaling that indicates a time duration window associated with the sidelink shared channel and an offset for the time duration window.

In some examples of the method, apparatuses, and non-transitory computer-readable medium described herein, transmitting the sidelink control reservation message may include operations, features, means, or instructions for transmitting the sidelink control reservation message indicating the starting TTI within the time duration window relative to the offset.

In some examples of the method, apparatuses, and non-transitory computer-readable medium described herein, transmitting the set of multiple aggregated sidelink messages include operations, features, means, or instructions for transmitting the set of multiple aggregated sidelink messages within the nine duration window relative to the starting TTI.

Some examples of the method, apparatuses, and non-transitory computer-readable medium described herein may further include operations, features, means, or instructions for transmitting the sidelink control reservation message that includes a quantity of bits selected based on the starting TTI and the quantity of the set of multiple time-contiguous TTIs.

In some examples of the method, apparatuses, and non-transitory computer-readable medium described herein, the quantity of bits may be selected based on the quantity of the set of multiple time-contiguous TTI satisfying a threshold.

Some examples of the method, apparatuses, and non-transitory computer-readable medium described herein may further include operations, features, means, or instructions for transmitting a second sidelink control reservation message indicating a first sidelink message of the set of multiple aggregated sidelink messages.

In some examples of the method, apparatuses, and non-transitory computer-readable medium described herein, the sidelink control reservation message includes an indication that the sidelink control reservation message may be associated with the second sidelink control reservation message.

In some examples of the method, apparatuses, and non-transitory computer-readable medium described herein, the aggregated sidelink resource reservation rule indicates that the sidelink control reservation message may be associated with the second sidelink control reservation message.

Some examples of the method, apparatuses, and non-transitory computer-readable medium described herein may further include operations, features, means, or instructions for transmitting the sidelink control reservation message that indicates the starting TTI and transmitting a second sidelink control reservation message indicating an ending TTI of the set of multiple time-contiguous TTIs, where a difference between the starting TTI and the ending TTI indicates the quantity of the set of multiple time-contiguous TTIs.

Some examples of the method, apparatuses, and non-transitory computer-readable medium described herein may further include operations, features, means, or instructions for transmitting the sidelink control reservation message that indicates the starting TTI and the quantity of the set of multiple time-contiguous TTIs with respect to a current TTI index in which the sidelink control reservation message may be transmitted in a periodic resource.

Some examples of the method, apparatuses, and non-transitory computer-readable medium described herein may further include operations, features, means, or instructions for transmitting the sidelink control reservation message that includes an indication that the starting TTI and the quantity of the set of multiple time-contiguous TTIs may be respective to a TTI index of one of a periodic resource or a dynamic resource.

In some examples of the method, apparatuses, and non-transitory computer-readable medium described herein, receiving the control signaling may include operations, features, means, or instructions for receiving the control signaling indicating the aggregated sidelink resource reservation rule that indicates a rule for calculating the starting TTI, the quantity of the set of multiple time-contiguous TTIs, or both, based on a configured offset, a time duration window, or both.

In some examples of the method, apparatuses, and non-transitory computer-readable medium described herein, receiving the control signaling may include operations, features, means, or instructions for receiving the control signaling indicating the aggregated sidelink resource reservation rule that indicates a rule for calculating the starting TTI the quantity of the set of multiple time-contiguous TTIs, or both, based on a periodic resource pool.

A method for wireless communications at a UE is described. The method may include receiving control signaling indicating an aggregated sidelink resource reservation rule for reserving time-contiguous TTIs, receiving a sidelink control reservation message indicating a starting TTI for reserving a set of multiple time-contiguous TTIs in a sidelink shared channel and a quantity of the set of multiple time-contiguous TTIs reserved for transmission of a set of multiple aggregated sidelink messages from a second UE based on the aggregated sidelink resource reservation rule, transmitting a second sidelink control reservation message indicating a second starting TTI for reserving a second set of multiple time-contiguous TTIs in the sidelink shared channel and a second quantity of the second set of multiple time-contiguous TTIs reserved for transmission of a second set of multiple aggregated sidelink messages based as least in part on the aggregated sidelink resource reservation rule and the sidelink control reservation message, and transmitting the second set of multiple aggregated sidelink messages via the second set of multiple time-contiguous TTIs of the sidelink shared channel.

An apparatus for wireless communications at a UE is described. The apparatus may include a processor, memory coupled with the processor, and instructions stored in the memory. The instructions may be executable by the processor to cause the apparatus to receive control signaling indicating an aggregated sidelink resource reservation rule for reserving time-contiguous TTIs, receive a sidelink control reservation message indicating a starting for reserving a set of multiple time-contiguous TTIs in a sidelink shared channel and a quantity of the set of multiple time-contiguous TTIs reserved for transmission of a set of multiple aggregated sidelink messages from a second UE based on the aggregated sidelink resource reservation rule, transmit a second sidelink control reservation message indicating a second starting TTI for reserving a second set of multiple time-contiguous TTIs in the sidelink shared channel and a second quantity of the second set of multiple time-contiguous TTIs reserved for transmission of a second set of multiple aggregated sidelink messages based as least in part on the aggregated sidelink resource reservation rule and the sidelink control reservation message, and transmit the second set of multiple aggregated sidelink messages via the second set of multiple time-contiguous TTIs of the sidelink shared channel.

Another apparatus for wireless communications at a UE is described. The apparatus may include means for receiving control signaling indicating an aggregated sidelink resource reservation rule for reserving time-contiguous TTIs, means for receiving a sidelink control reservation message indicating a starting TTI for reserving a set of multiple time-contiguous TTIs in a sidelink shared channel and a quantity of the set of multiple time-contiguous TTIs reserved for transmission of a set of multiple aggregated sidelink messages from a second UE based on the aggregated sidelink resource reservation rule, means for transmitting a second sidelink control reservation message indicating a second starting TTI for reserving a second set of multiple time-contiguous TTIs in the sidelink shared channel and a second quantity of the second set of multiple time-contiguous TTIs reserved for transmission of a second set of multiple aggregated sidelink messages based as least in part on the aggregated sidelink resource reservation rule and the sidelink control reservation message, and means for transmitting the second set of multiple aggregated sidelink messages via the second set of multiple time-contiguous TTIs of the sidelink shared channel.

A non-transitory computer-readable medium storing code for wireless communications at a UE is described. The code may include instructions executable by a processor to receive control signaling indicating an aggregated sidelink resource reservation rule for reserving time-contiguous TTIs, receive a sidelink control reservation message indicating a starting TTI for reserving a set of multiple time-contiguous TTIs in a sidelink shared channel and a quantity of the set of multiple time-contiguous TTIs reserved for transmission of a set of multiple aggregated sidelink messages from a second UE based on the aggregated sidelink resource reservation rule, transmit a second sidelink control reservation message indicating a second starting TTI for reserving a second set of multiple time-contiguous TTIs in the sidelink shared channel and a second quantity of the second set of multiple time-contiguous TTIs reserved for transmission of a second set of multiple aggregated sidelink messages based as least in part on the aggregated sidelink resource reservation rule and the sidelink control reservation message, and transmit the second set of multiple aggregated sidelink messages via the second set of multiple time-contiguous TTIs of the sidelink shared channel.

Some examples of the method, apparatuses, and non-transitory computer-readable medium described herein may further include operations, features, means, or instructions for receiving control signaling that indicates a time duration window associated with the sidelink shared channel and an offset of the time duration window.

In some examples of the method, apparatuses, and non-transitory computer-readable medium described herein, transmitting the second sidelink control reservation message may include operations, features, means, or instructions for transmitting the second sidelink control reservation message indicating the starting TTI within the time duration window relative to the offset.

In some examples of the method, apparatuses, and non-transitory computer-readable medium described herein, transmitting the second set of multiple aggregated sidelink messages may include operations, features, means, or instructions for transmitting the second set of multiple aggregated sidelink messages within the time duration window relative to the starting TTI.

Some examples of the method, apparatuses, and non-transitory computer-readable medium described herein may further include operations, features, means, or instructions for transmitting the second sidelink control reservation message that includes a quantity of bits selected based on the starting TTI and the quantity of the second set of multiple time-contiguous TTIs.

In some examples of the method, apparatuses, and non-transitory computer-readable medium described herein, the quantity of bits may be selected based on the quantity of the second set of multiple time-contiguous TTIs satisfying a threshold.

Some examples of the method, apparatuses, and non-transitory computer-readable medium described herein may further include operations, features, means, or instructions for transmitting a third sidelink control reservation message indicating a first sidelink message of the second set of multiple aggregated sidelink messages.

In some examples of the method, apparatuses, and non-transitory computer-readable medium described herein, the second sidelink control reservation message includes an indication that the second sidelink control reservation message may be associated with the third sidelink control reservation message.

In some, examples of the method, apparatuses, and non-transitory computer-readable medium described herein, the aggregated sidelink resource reservation rule indicates that the second sidelink control reservation message may be associated with the third sidelink control reservation message.

Some examples of the method, apparatuses, and non-transitory computer-readable medium described herein may further include operations, features, means, or instructions for receiving the sidelink control reservation message that indicates the starting TTI and receiving a third sidelink control reservation message indicating an ending TTI of the set of multiple time-contiguous TTIs, where a difference between the starting TTI and the ending TTI indicates the quantity of the set of multiple time-contiguous TTIs.

Some examples of the method, apparatuses, and non-transitory computer-readable medium described herein may further include operations, features, means, or instructions for transmitting the second sidelink control reservation message that indicates the starting TTI and the quantity of the transmitting set of multiple time-contiguous TTIs with respect to a current TTI index in which the second sidelink control reservation message may be transmitted in a periodic resource.

Some examples of the method, apparatuses, and non-transitory computer-readable medium described herein may further include operations, features, means, or instructions for transmitting the second sidelink control reservation message that includes an indication that the starting TTI and the quantity of the set of multiple time-contiguous TTIs may be respective to a TTI index of one of a periodic resource or a dynamic resource.

In some examples of the method, apparatuses, and non-transitory computer-readable medium described herein, receiving the control signaling may include operations, features, means, or instructions for receiving the control signaling indicating the aggregated sidelink resource reservation rule that indicates a rule for calculating the second starting TTI, the quantity of the second set of multiple time-contiguous TTIs, or both, based on a configured offset, a time duration window, or both.

In some examples of the method, apparatuses, and non-transitory computer-readable medium described herein, receiving the control signaling may include operations, features, means, or instructions for receiving the control signaling indicating the aggregated sidelink resource reservation rule that indicates a rule for calculating the second starting TTI, the quantity of the second set of multiple time-contiguous TTIs, or both, based on a periodic resource pool.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing, devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
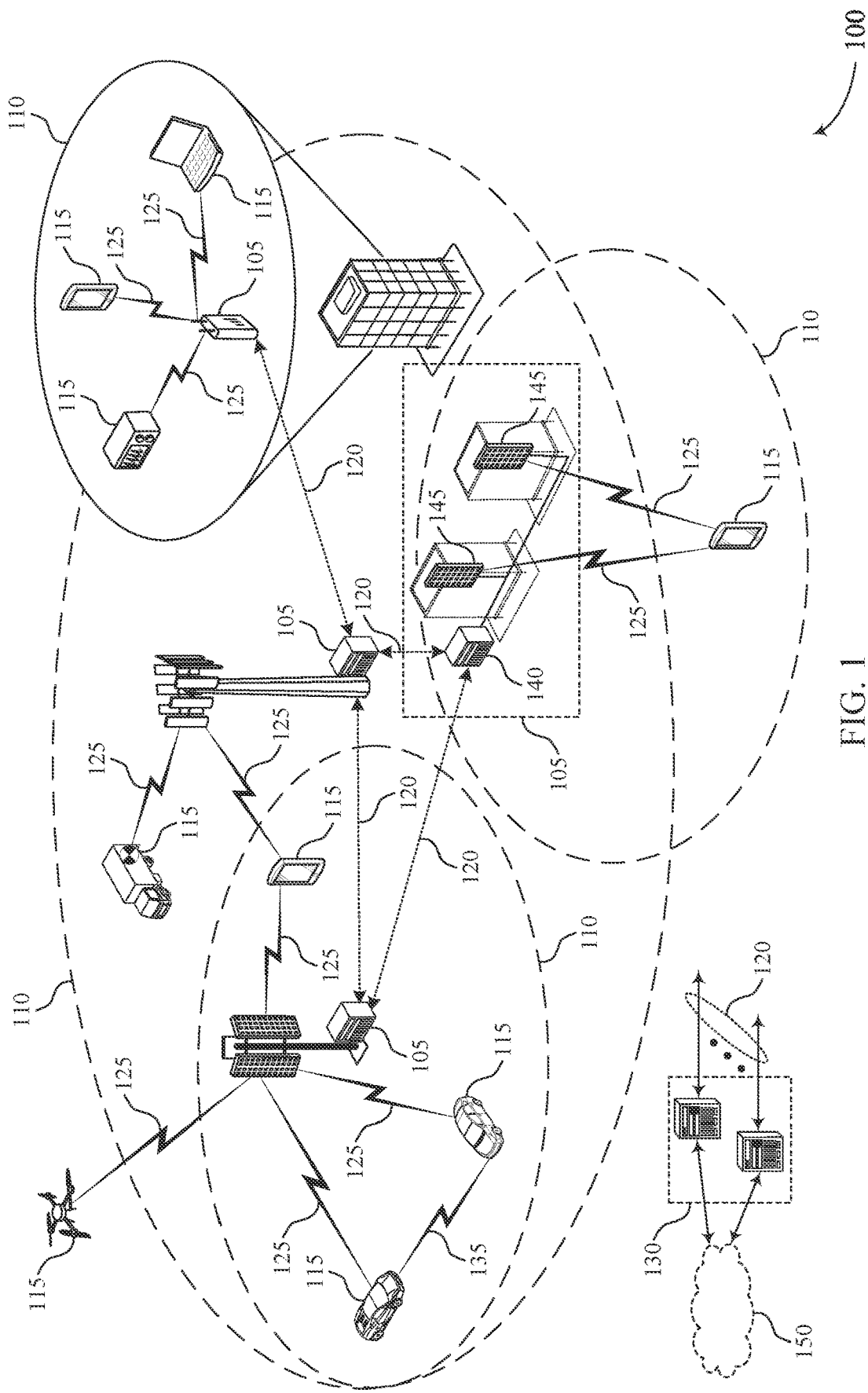
FIG. 1 illustrates an example of a wireless communications system that supports reservation techniques for aggregated sidelink communications in accordance with aspects of the present disclosure.

Some wireless communications systems support sidelink communications between multiple devices, such as sidelink communications between user equipments (UEs) or other wireless communications devices. In some examples, a wireless communications system may support one or more sidelink resource allocation modes. For example, in a first sidelink resource allocation mode (e.g., sidelink resource allocation mode 1), a base station may transmit control information scheduling UEs for sidelink data messages in the system (e.g., the base station may transmit a grant to UEs for sidelink channel access). In a second sidelink resource allocation mode (e.g., sidelink resource allocation mode 2), UEs may autonomously perform channel sensing to select or reserve resources for a sidelink transmission. Stated alternatively, UEs may use channel sensing to conduct distributed sidelink channel access. To perform channel sensing, a UE may measure reference signaling received via one or more resources within a sensing window according to a signal metric level (e.g., a reference signal received power (RSRP) level). The reference signaling may correspond to sidelink control information (SCI) transmitted by another UE in the sensing window, and the SCI may reserve one or more resources in a corresponding resource selection window. That is, a transmitting UE may transmit SCI to reserve the one or more resources and a receiving UE may exclude or include the one or more resources from a set of available resource candidates based on performing channel sensing.

In some examples, the transmitting UE may reserve resources in a dynamic manner (e.g., the SCI may indicate the frequency, time, or both of a resource for a sidelink data transmission), or the UE may reserve the resources in a periodic manner (e.g., the SCI may include a codepoint to facilitate periodic reservation for semi-persistent scheduling). However, wireless communications systems may fail to support aggregated resource reservation. For example, a UE may attempt to reserve multiple time-contiguous resources for transmission of multiple aggregated data messages (e.g., physical sidelink shared channel (PSSCH) messages). In some cases, a receiving UE may monitor multiple SCIs to identify each of the reserved resources (e.g., each SCI may indicate a corresponding transmission time interval (TTI) for one of the data messages), which may result in relatively high power consumption. In some other cases, the receiving UE may fail to monitor each of the multiple SCIs and may fail to exclude one of the reserved resources from a set of available resource candidates, which may result in increased interference in the system.

Accordingly, the techniques described herein may provide UEs with an indication of a set of aggregated sidelink messages, such as a start-length-indicator-value (SLIV) included in a sidelink control reservation message. Such an indication may enable UEs to reserve a set of TTIs (e.g., slots or other TTIs) for communication of the set of aggregated sidelink messages. For example, a transmitting UE may transmit a reservation message with SCI including the indication of the start, length, or both of a burst of aggregated PSSCH messages, which may enable UEs monitoring the channel to identify the reserved resources from relatively fewer reservation messages, among other benefits.

As an illustrative example, a UE may identify data for transmission over a set of aggregated TTIs (e.g., a set of slots). That is, the UE may attempt to reserve sidelink resources (e.g., a set of contiguous TTIs) for communication of a set of aggregated data messages. The UE may identify an aggregated sidelink resource reservation rule for reserving the sidelink resources. For example, the UE may receive control signaling indicating the rule, the UE may be preconfigured with the rule, or a combination thereof. Based on the sidelink resource reservation rule, the UE may transmit a sidelink control reservation message indicating the set of aggregated data messages. For example, the UE may transmit sidelink control information with an indication of a length, start, or both of a burst of sidelink messages (e.g., a SLIV). In some examples, the indication may be relative to a configured boundary. For example, the UE may receive control signaling indicating a layer 3 (L3) configured floating slot boundary. For instance, the UE may receive the control signaling indicating an offset of a resource pool, a window of the resource pool, or both. In such cases, the indication may be relative to the offset, the window, or both. Additionally or alternatively, the indication of the length, start, or both of the burst may be relative to a current TTI index of the respective sidelink control reservation message (e.g., for periodic resource reservations).

In some examples, the wireless communications system may support multiple sidelink reservations in SCI (e.g., two reservations). In some such examples, the reservation for the burst of sidelink messages (e.g., the SCI including the indication of the length, start, or both) may include a bit indicating that the reservation is attached to a second reservation (e.g., the second reservation may indicate a corresponding message of the burst and the first reservation may indicate a SLIV relative to the corresponding message of the burst). In some examples, such a bit may be configured at the UE (e.g., the UE may save such a bit with a L3 preconfiguration indicating that when two reservations are present in a control reservation message the messages are linked or attached to each other). In some examples, the UE may transmit multiple (e.g., two) sidelink reservations, for example, where a first reservation indicates resources of a first message of the burst of sidelink messages and a second reservation indicates resources of a second message (e.g., an initial message or a last message) of the burst of sidelink messages. In some such examples, the UE may indicate a quantity of messages in the burst in addition or alternative to the indicated initial or last message. By transmitting the multiple reservations, the UE may indicate the length, start, end, or any combination thereof of the burst of sidelink messages.

Aspects of the disclosure are initially described in the context of wireless communications systems. Aspects of the disclosure are then described in the context of resource schemes and a process flow. Aspects of the disclosure are further illustrated by and described with reference to apparatus diagrams, system diagrams, and flowcharts that relate to reservation techniques for aggregated sidelink communications.

FIG. 1 illustrates an example of a wireless communications system 100 that supports reservation techniques for aggregated sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 (kHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may support techniques for aggregated sidelink communications as described herein. For example, devices of the wireless communications system 100 may implement an indicator of a set of aggregated sidelink messages, such as a SLIV included in a sidelink control reservation message. For example, a UE 115 may identify data for transmission over a set of aggregated TTIs (e.g., a set of slots). That is, the UE 115 may attempt to reserve sidelink resources (e.g., a set of contiguous TTIs) for communication of a set of aggregated sidelink data messages. The UE 115 may identify an aggregated sidelink resource reservation rule for reserving the sidelink resources for the set of aggregated sidelink data messages. For example, the UE 115 may receive control signaling indicating the rule, the UE 115 may be preconfigured with the rule, or a combination thereof. Based on the sidelink resource reservation rule, the UE 115 may transmit a sidelink control reservation message indicating the set of aggregated data messages. For example, the UE 115 may transmit sidelink control information with an indication of a length, start, or both of a burst of sidelink messages (e.g., a SLIV). Additionally or alternatively, the UE 115 may transmit multiple (e.g., two) reservation messages, where a first reservation message indicates resources of a first message of the burst of sidelink messages and a second reservation message indicates resources of a second message (e.g., a last message or an initial message) of the burst of sidelink messages. Such techniques may enable the UE 115 to reserve multiple TTIs of a sidelink channel with a resource reservation message, which may result in reduced interference, improved communications efficiency, or both, among other benefits. For example, other UEs 115 in the system may receive the indication of the burst of sidelink messages and the other UEs 115 may perform channel sensing to determine whether to include or exclude the burst of reserved resources (e.g., a frequency range and a set of consecutive TTIs such as slots) in a set of available resources. As an example, another UE 115 may refrain from reserving the reserved resources and may instead select other resources for transmission, which may reduce interference, improve communications, or the like.

Figure 2:
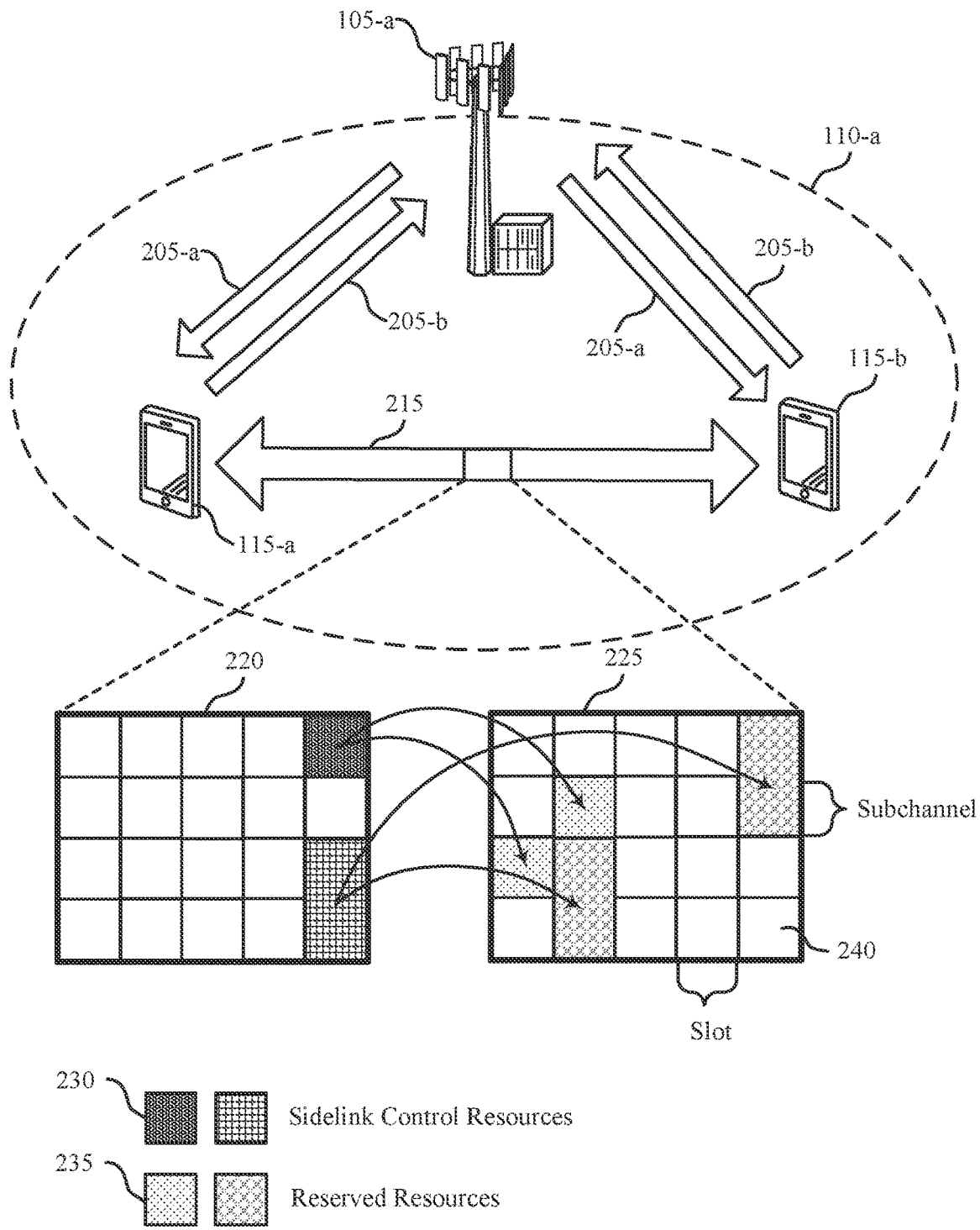
FIG. 2 illustrates an example of a wireless communications system that supports reservation techniques for aggregated sidelink communications in accordance with aspects of the present disclosure.

FIG. 2 illustrates an example of a wireless communications system 200 that supports reservation techniques for aggregated sidelink communications in accordance with aspects of the present disclosure. The wireless communications system 200 may include a base station 105-*a*, a UE 115-*a*, and a UE 115-*b*, which may be examples of a base station 105 and UEs 115 as described with reference to FIG. 1. In some examples, the base station 105-*a*, the UE 115-*a*, and the UE 115-*a* may be located in a geographic coverage area 110-*a*. The base station may communicate with the UE 115-*a* and the UE 115-*b* via downlink communication links 205-*a* and uplink communication links 205-*b*. Additionally, the UE 115-*a* may communicate with the UE 115-*b* via a sidelink communication link 215 (e.g., a PC5 link).

Sidelink communications may be described as communications between two or more wireless devices (e.g., communication between the UE 115-*a* and the UE 115-*b*). In some examples, the UEs 115 may be examples of vehicles or other examples of UEs as described herein (e.g., the wireless communications system may be an example of a system supporting WV communications, V2X communications, etc.). To facilitate sidelink communication, the UE 115-*a* and the UE 115-*b* may be configured with a set of resources (e.g., time and frequency resources) allocated for sidelink communications within one or more sidelink resource pools. A sidelink resource pool may include one or more subchannels in a frequency domain and one or more slots in a time domain, among other examples of frequencies and TTIs. That is, the sidelink resource pool may include multiple resource elements 240.

In some examples, sidelink communication between the UE 115-*a* and the UE 115-*b* may be scheduled according to a sidelink resource allocation mode 1. During the sidelink resource allocation mode 1, the base station 105-*a* may indicate a set of resources within the one or more sidelink resource pools to a transmitting UE 115, and the transmitting UE 115 may utilize the set of resources for sidelink transmissions. For example, the base station 105-*a* may transmit, to the UE 115-*a* (e.g., a transmitting UE 115-*a*), an indication of a set of resources to use to transmit a message to the UE 115-*b*, and the UE 115-*a* may utilize one or more resources of the set to transmit the message to the UE 115-*b*. Stated alternatively, mode 1 may be for in-coverage deployments where a sidelink transmitting UE 115 receives a grant for sidelink channel access. In some examples, a transmitting UE 115, such as the UE 115-*a*, may select resources for sidelink transmissions according to a sidelink resource allocation mode 2. During the sidelink resource allocation mode 2, the UE 115-*a* may select a set of resources from the one or more sidelink resource pools for sidelink transmissions autonomously (e.g., without signaling from the base station 105-*a*). Stated alternatively, mode 2 may support out-of-coverage deployments where a sidelink transmitting UE 115 uses sensing to conduct distributed sidelink channel access. In either case, the UE 115-*a* may transmit SCI to the UE 115-*b* indicating the selected set of resources such that the UE 115-*b* may locate and decode transmissions from the UE 115-*a*. For example, the UE 115-*a* may transmit SCI with a reservation field (e.g., a reservation message) to facilitate sensing based collision avoidance for channel access in mode 2. In some examples, the sidelink resource pool may support both mode 1 and mode 2 operations (e.g., the reservation included in the SCI from a mode 1 UE may be the same or different as that from a mode 2 UE).

When a transmitting UE 115, such as the UE 115-*a*, is operating in sidelink resource allocation mode 2, the transmitting UE 115-*a* may perform a channel sensing procedure. In some examples, the UE 115-*a* may perform channel sensing in the sensing window 220. The sensing window 220 may be associated with the resource selection window 225. The resource selection window 225 may be subsequent to the sensing window 220 in a time domain and may include a set of resource candidates (e.g., resources that the transmitting UE 115-*a* may potentially transmit on). One or more of the resource candidates may be reserved for sidelink communication by one or more other UEs 115. As such, the UE 115-*a* may perform channel sensing during the sensing window 220 to determine an available set of resource candidates in the resource selection window 225. Sensing may refer to the UE 115-*a* monitoring for reference signaling on resource elements 240 of the sensing window 220. For example, the UE 115-*a* may monitor for SCI of other UEs 115 received on sidelink control resources 230. Decoding SCI of other UEs 115 may inform the UE 115-*a* which resources of the resource candidates in the resource selection window 225 are reserved for transmission by other UEs 115 (e.g., the reserved resources 235). In some examples, the UE 115-*a* may determine that all resources of the resource selection window 225 excluding the reserved resources 235 are available. The UE 115-*a* may additionally or alternatively measure a channel metric (e.g., a RSRP) associated with the SCI transmitted by other UEs 115 to determine whether the corresponding reserved resources 235 may be available for a transmission by the UE 115-*a*. If the UE 115-*a* determines that the measured signal strength of reference signaling corresponding to a reserved resource 235 is below a threshold, the UE 115-*a* may include the resource in the available set of resource candidates (e.g., the scheduled transmission in the reserved resource 235 may not interfere with a transmission by the UE 115-*a*). In some examples, the UE 115-*a* may increase or decrease the threshold based on a percentage of available resources in the resource selection window 225 or a priority associated with the scheduled transmission by the UE 115-*a*.

Once the UE 115-*a* determines the available resources, a physical layer may indicate the available resources to higher layers, and the higher layers may perform resource selection and reservation. In some examples, the selected resources may be reserved for a sidelink message, a retransmission of a sidelink message, or both. The UE 115-*a* may select and reserve resources such that all retransmission for a sidelink packet may occur within a configured delay period (e.g., a packet delay budget (PDB)). The UE 115-*a* may select the resources from the available set of resource candidates in response to receiving a resource selection trigger (e.g., an indication the UE 115-*a* has data to transmit). The duration from the start of the sensing window 220 and the resource selection trigger may be configured (e.g., 100 ms, 1100 ms, or some other duration). In some examples, the UE 115-*a* and the UE 115-*b* may confirm resource availability some time before the resource selection window 225 and the duration between the resource selection trigger to the end of the resource selection window 225 may be configured based on a priority and a sub-carrier spacing (SCS) (e.g., 15 kHz, 30 kHz, 60 kHz, 120 kHz, or some other SCS value).

In some examples, SCI may reserve up to two future resources (e.g., two resource elements 240 for PSSCH messages). In some examples, such SCI may reserve the future resources at non-contiguous slots (e.g., to mitigate half-duplex deafness, for example, for broadcast communications). In some cases, the SCI may include a codepoint to facilitate periodic reservation for SPS-like sidelink transmissions (e.g., the SCI may reserve a resource and indicate a periodicity that the same frequency resources are reserved across multiple periods of time).

In some examples, the wireless communications system 200 may support sidelink for various vertical frequency domains. However, not every vertical domain may have access to sub-6 GHz licensed bands. Further, vertical domains with access to such bands may seek opportunity in unlicensed (e.g., shared) spectrum bands for a more economical or wider data pipe. Stated alternatively, some devices in the wireless communications system 200 may support unlicensed communications, licensed communications, or both (e.g., UEs 115 may reserve resources in one or both of licensed and unlicensed frequency bands). In some examples, the devices may use various bandwidths to realize diverse deployment scenarios and use cases (e.g., there may be around 1.8 GHz bandwidth in 5G 6 GHz unlicensed bands, around 7 GHz in 60 GHz unlicensed band, etc., though such quantities are examples and any such ranges and quantity may be used).

PSSCH aggregation may be useful for both mode 1 and mode 2 operation. For non-V2X use cases. PSSCH aggregation may be used for communications between well-separated UEs that may conduct narrow-band channel access and rely on time-domain repetitions to close link. For this case, sensing once every three PSSCHs may really be a burden on such UEs, and as such may benefit from using the PSSCH aggregation described herein. Channel occupancy time (COT) based access may also be used for low overhead communication over unlicensed hand imposed with listen-before-talk (LBT), such as the 5 GHz/6 GHz unlicensed band. In this regard, a back-to-back burst of aggregated PSSCHs using the techniques as described herein may be conveniently transmitted within a COT.

As described herein, the wireless communications system 200 may support PSSCH aggregation and a reservation mechanism for such aggregation. For example, the various devices may implement an indication of a set of aggregated sidelink messages, such as a start-length-indicator-value (SLIV) included in a sidelink control reservation message. Such an indication may enable UEs 115 to reserve a set of transmission time intervals (TTIs) (e.g., slots) for communication of the set of aggregated sidelink messages. For example, a transmitting UE 115-a may transmit a reservation message with SCI including the indication of the start, length, or both of a burst of aggregated PSSCH messages, which may enable UEs 115 monitoring the channel to identify the reserved resources from relatively fewer reservation messages, among other benefits.

As an illustrative example, the UE 115-a may identify data for transmission over a set of aggregated TTIs (e.g., a set of slots). That is, the UE 115-a may attempt to reserve sidelink resources (e.g., a set of contiguous TTIs) for communication of a set of aggregated data messages. The UE 115-a may identify an aggregated sidelink resource reservation rule for reserving the sidelink resources. For example, the UE 115-a may receive control signaling indicating the rule (e.g., from the base station 105-a, the UE 115-b, or another device), the UE 115-a may be pre-configured with the rule, or a combination thereof. Based on the sidelink resource reservation rule, the UE 115-a may transmit a sidelink control reservation message indicating the set of aggregated data messages. For example, the UE 115-a may transmit sidelink control information with an indication of a length, start, or both of a burst of sidelink messages (e.g., a SLIV). In some examples, the indication may be relative to a configured boundary. For example, the UE 115-a may receive control signaling indicating a L3 configured floating slot boundary. For instance, the UE 115-a may receive the control signaling indicating an offset of a resource pool, a window of the resource pool, or both. In such cases, the indication may be relative to the offset, the window, or both. Additionally or alternatively, the indication of the length, start, or both of the burst may be relative to a current TTI index of the respective sidelink control reservation message (e.g., for periodic resource reservations).

In some examples, the wireless communications system 200 may support multiple sidelink reservations in SCI (e.g., two reservations). In some such examples, the reservation for the burst of sidelink messages (e.g., the SCI including the indication of the length, start, or both) may include a bit indicating that the reservation is attached to a second reservation (e.g., the second reservation may indicate a corresponding message of the burst and the first reservation may indicate a SLIV relative to the corresponding message of the burst). In some examples, such a bit may be configured at the UE 115-a (e.g., the UE 115-a may save such a bit with a L3 pre-configuration indicating that when two reservations are present in a control reservation message the messages are linked or attached to each other). In some examples, the UE 115-a may transmit multiple (e.g., two) sidelink reservations, for example, where a first reservation indicates resources of a first message of the burst of sidelink messages and a second reservation indicates resources of a second message (e.g., an initial message or a last message) of the burst of sidelink messages. In some such examples, the UE 115-a may indicate a quantity of messages in the burst in addition or alternative to the indicated initial or last message. By transmitting the multiple reservations, the UE 115-a may indicate the length, start, end, or any combination thereof of the burst of sidelink messages.

Figure 3:
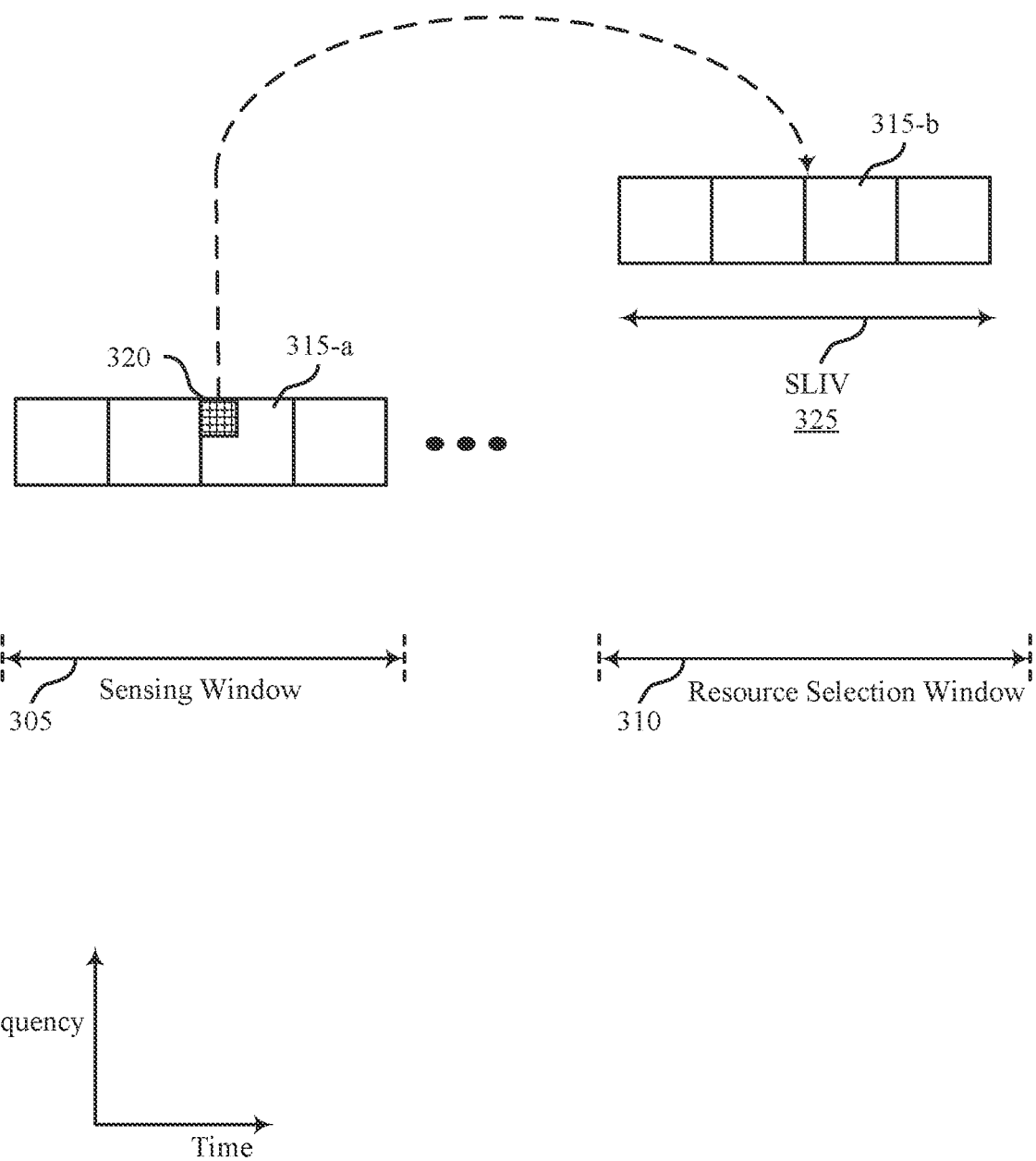
FIGS. 3-6 illustrate examples of reservation schemes that support reservation techniques for aggregated sidelink communications in accordance with aspects of the present disclosure.

FIG. 3 illustrates an example of a resource scheme 300 that supports reservation techniques for aggregated sidelink communications in accordance with aspects of the present disclosure. In some examples, the resource scheme 300 may represent a scheme used by a UE 115 (e.g., a transmitting UE 115) to reserve sidelink resources for transmitting a burst of aggregated sidelink messages as described herein. The UE 115 may communicate with one or more other UEs 115 using resource elements 315 (e.g., time and frequency resources) in a resource pool over a sidelink channel (e.g., a sidelink pool as described with reference to FIG. 2). The UE 115 and the one or more other UEs 115 may be examples of the UEs 115 described with reference to FIGS. 1 and 2.

As shown for illustrative clarity, a transmitting UE 115 may transmit on four resource elements 315 during a sensing window 305, though any quantity of resource elements may be used. A receiving UE 115 may monitor a sidelink resource pool during the sensing window 305 and detect that the transmitting UE 115 is transmitting on one or more of the four resource elements 315. The receiving UE 115 may decode SCI 320 indicating resources reserved by the transmitting UE 115 in the resource selection window 310.

In the illustrative example of FIG. 3, each resource element 315 of the sensing window 305 may include a respective SCI reserving a corresponding resource element 315 of the resource selection window 310. For example, the resource element 315-*a* may include SCI 320 indicating the reservation of the resource element 315-*b*. The first resource element 315 shown in the sensing window 305 may indicate that the first resource element 315 shown in the resource selection window 310 is reserved for a first sidelink message (e.g., PSSCH message) of the set of four aggregated sidelink messages (e.g., by transmitting SCI in each of the resource elements 315 in the sensing window 305, the transmitting UE 115 may reserve four time-contiguous resource elements 315 in the resource selection window 310 for communication of aggregated PSSCH messages). However, in some cases a receiving UE 115 may expend a relatively large amount of power monitoring each of the TTIs (e.g., four slots) of the sensing window 305, or the receiving UE 115 may miss or fail to decode one or more of the SCIs and thus be unaware that one of the TTIs of the aggregated sidelink messages is reserved by the transmitting UE 115.

In accordance with the techniques described herein, the SCI 320 transmitted by the transmitting UE 115 may include an indication of a burst of aggregated sidelink messages in the resource selection window 310. For example, the SCI 320 may include a SLIV 325 indicating a start, a length, or both of the burst of messages. In some examples, each of the SCIs (e.g., the four SCIs corresponding to each resource element 315 in the sensing window 305) include a respective SLIV 325.

As an illustrative example, a receiving UE 115 may successfully receive and decode the SCI 320 of the resource element 315-*a*. The SCI 320 may indicate that the resource element 315-*b* is reserved for communication of a sidelink message. Additionally or alternatively, the SCI 320 may include a codepoint carrying information indicating when the aggregated PSSCHs in the resource selection window 310 start and end (e.g., a SLIV with respect to a reserved slot index of the resource element 315-*b*). For example, the transmitting UE 115 may encode the resources of the burst of messages in time-contiguous TTIs as a SLIV anchored at aril boundary (e.g., a L3 configured floating slot boundary as described with reference to FIG. 4). Such techniques may be used for any quantity of sidelink messages, such as a burst with more than 2 PSSCH messages (e.g., two or more repetitions of a PSSCH data message).

In some examples, sidelink communications may support multiple (e.g., two) reservations. In some such examples, the reservation for PSSCH aggregation the SLIV 325) may use another bit to indicate towards which reservation it is attached. For example, a first reservation of the SCI 320 may reserve the resource element 315-*b* and a second reservation of the SCI 320 may include the SLIV 325 indicating the burst of aggregated messages. The SLIV 325 may include a bit indicating that the second reservation is attached to (e.g., corresponds to) the first reservation. Additionally or alternatively, such a bit (or bits) may be saved with an L3 pre-configuration (e.g., when there are two reservations the UE 115 may be configured to assume that the second reservation is attached to the first reservation).

By implementing the SLAV 325 (or another indicator of the resources for a burst of aggregated sidelink messages in the resource selection window 310) as described herein, a receiving UE may be enabled to learn the reservation of the PSSCHs (e.g., the reserved resource elements 315) from a single SCI 320. Thus, the receiving UE 115 may refrain from monitoring one or more of the resource elements 315 of the sensing window 305 to save power, the receiving UE 115 may still identify the reserved resources of the burst even if the receiving UE 115 misses one or more of the corresponding SCIs, or any combination thereof, among other potential benefits.

In some examples, one or more UEs 115 may identify one or more aggregated sidelink resource reservation rules. For example, the UEs 115 may receive (or transmit) control signaling indicating an aggregated sidelink resource reservation rule for reserving time-contiguous TTIs as described herein, the UEs 115 may be preconfigured with the rule, or a combination thereof. Such a rule may indicate one or more schemes (e.g., configurations) that a UE 115 is to use for reserving the sidelink resources for transmission of aggregated sidelink messages (e.g., aggregated PSSCHs). That is, the rule may indicate that the UE is to use the resource reservation methods illustrated with reference to FIG. 3-6. For example, the rule may indicate to use a SLIV 325, the rule may indicate to use multiple reservation messages (e.g., as described with reference to resource scheme 600), the rule may indicate that the SLIV 325 is relative to an offset or a window (e.g., as described with reference to resource scheme 400), the rule may indicate to use any other resource schemes or techniques described herein, or any combination thereof.

Figure 4:
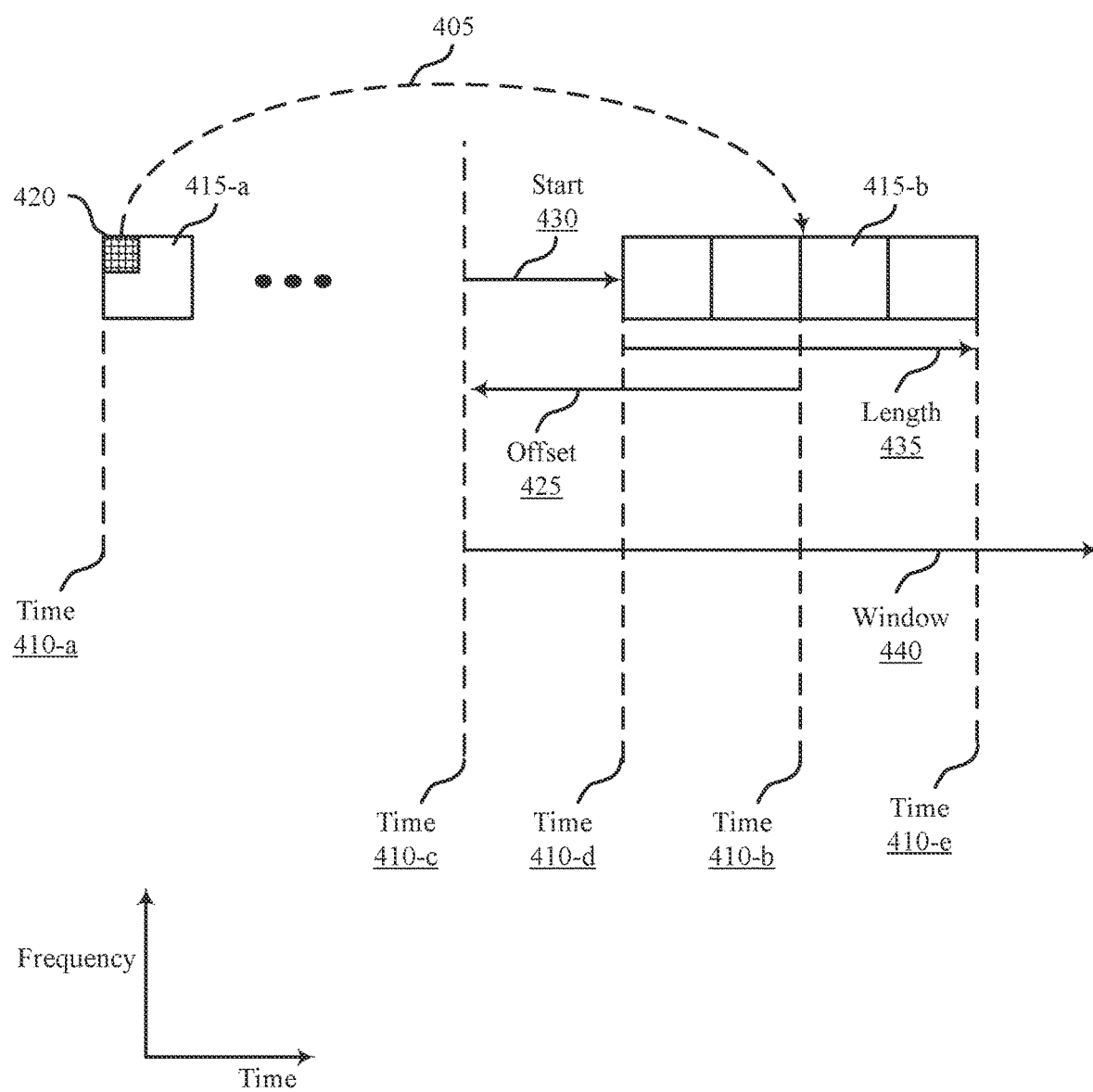

FIG. 4 illustrates an example of a resource scheme 400 that supports reservation techniques for aggregated sidelink communications in accordance with aspects of the present disclosure. The resource scheme 400 may implement, or be implemented by, aspects of wireless communications system 100, the wireless communications system 200, the resource scheme 300, or any combination thereof. In some examples, the resource scheme 400 may represent a scheme used by a UE 115 (e.g., a transmitting UE 115) to reserve sidelink resources for transmitting a burst of aggregated sidelink messages as described herein. The UE 115 may communicate with one or more other UEs 115 using resource elements 415 (e.g., time and frequency resources) in a resource pool over a sidelink channel (e.g., a sidelink pool as described with reference to FIG. 2). The UE 115 and the one or more other UEs 115 may be examples of the UEs 115 described with reference to FIGS. 1-3.

A transmitting UE 115 may transmit a side-link control reservation message 405 at time 410-*a* to other UEs 115. For example, the transmitting UE 115 may transmit SCI 420 over the resource element 415-*a* and the SCI 420 may include a reservation of the resource element 415-*b* in addition or alternative to an indication of a set of reserved sidelink resources for a set of aggregated messages. That is, the SCI 420 may enable receiving CIEs 115 to identify four time-contiguous (e.g., consecutive) TTIs for a burst of PSSCH messages in the example of FIG. 4, though any quantity of sidelink control reservation messages 405, quantity of messages or TTIs in the burst, etc., may be used instead. In some examples, UEs 115 may identify one or more rules for reserving TTIs for aggregated sidelink messages. The one or more rules may indicate to implement one or more aspects of the resource scheme 400 in addition or alternative to other configurations, schemes, and techniques as described herein.

In the example of the resource scheme 400, the SCI 420 may include a SLIV indication. For example, the sidelink control reservation message 405 (e.g., reservation) may indicate that the resource element 415-*b* is reserved for a transmission of one of the aggregated sidelink messages. The same message or another reservation message may include an indication (e.g., one or more bits) of the start, length, or both of the burst of messages.

For example, the indication of the SCI 420 may indicate a start 430 of the burst and a length 435 of the burst relative to the offset 425, the window 440, the reservation of the resource element 415-*b* (e.g., the slot index of the resource element 415-*b*), or any combination thereof. In some examples, UEs 115 may be configured with the window 440 of a resource pool for resource reservations. For example, a base station 105 or a group leader UE 115 may transmit control signaling indicating the window 440 and the offset 425. Additionally or alternatively, the window 440 or the offset 425 or both may be pre-configured at the UE 115. Thus, the UE 115 may identity a boundary (e.g., an L3 configured floating slot boundary) and the SLIV may be anchored at the TTI boundary. For example, the time 410-*c* may be the L3 configuration for the start of the window 440 (e.g., the length of the window 440 may additionally or alternatively be configured). The offset 425 may be referred to as "O" and the window 440 may be referred to as "W." The offset 425 may be the configured offset with respect to the resource pool and the window 440 may be the configured window of the resource pool.

The SLIV may indicate the length 435. The length 435 may be a quantity of TTIs (e.g., slots) of the burst of aggregated sidelink messages. For example, the length 435 may extend across four slots in the example of FIG. 4, though any value may be used for the length 435. In other words, the length 435 may indicate the time duration of the burst of message from the time 410-*d* to the time 410-*e*. The SLIV may indicate the start 430 of the burst of messages. For example, the SLIV may indicate a quantity of TTI between the time 410-*c* (e.g., the offset 425 may point to the start of the window 440 at the time 410-*c*) and the time 410-*d* (e.g., an initial TTI of the burst). That is, the start 430 of the PSSCH burst may be calculated from O and the index of the reserved PSSCH within the burst (e.g., the resource element 415-*b*).

In some examples, the SLIV may be an example of a quantity of bits indicating the start 430 and the length 435. In some cases, the UE may determine the SLIV bit-width or the UE may be pre-configured with a bit-width of the SLIV. For example, the SLIV may be built on a tree graph and in general the SLIV bit-width (e.g., the quantity of bits of the SLIV) may be determined by one or more equations or algorithms. As an illustrative example, the quantity of bits of the SLIV may be represented as $$\mathrm{ceil}\left(\log2\left(\frac{W(W+1)}{3}\right)\right).$$

In such an equation, W may represent the length of the window 440. In some examples, the bit-width may be reduced by trimming irrelevant nodes in a tree graph, which may reduce signaling overhead of the SLIV. For example, with a W of 5, there may be 15 possible SLIVs in a tree graph and thus 4 bits may be used to indicate one of the 15 possible values. However, the bits of the SLIV may be reduced by removing SLIVs with a length 435 of 1 (e.g., a single message or non-aggregation cases). Additionally or alternatively, the UE 115 may be configured with a threshold (e.g., maximum) quantity of aggregated messages, which may be referred to as A. It may be convenient to set the parameters as O=A−1 and W=2*A−1. In such cases, the bits of the SLIV may be reduced by removing SLIVs with a length 435 greater than the threshold (e.g., with a threshold of 3 back-to-back aggregated messages, SLIVs capable of indicating 4, 5, or higher lengths 435 may be removed or otherwise not considered). As an illustrative example, 7 possible SUVs may be used to indicate the start 430 and length 435 when A is 3 and non-aggregation is not indicated, and thus 3 bits may successfully indicate the value of the start 430 (e.g., the quantity of slots from the configured offset 425 from the time 410-*b*) and the value of the length 435 (e.g., the quantity of time-contiguous slots in the burst). Additionally or alternatively, the SLIV bit width may be further reduced if its configured to be used for a threshold burst length (e.g., a burst length greater than 2), in which case 2 bits may be enough in examples where A is 3.

Figure 5:
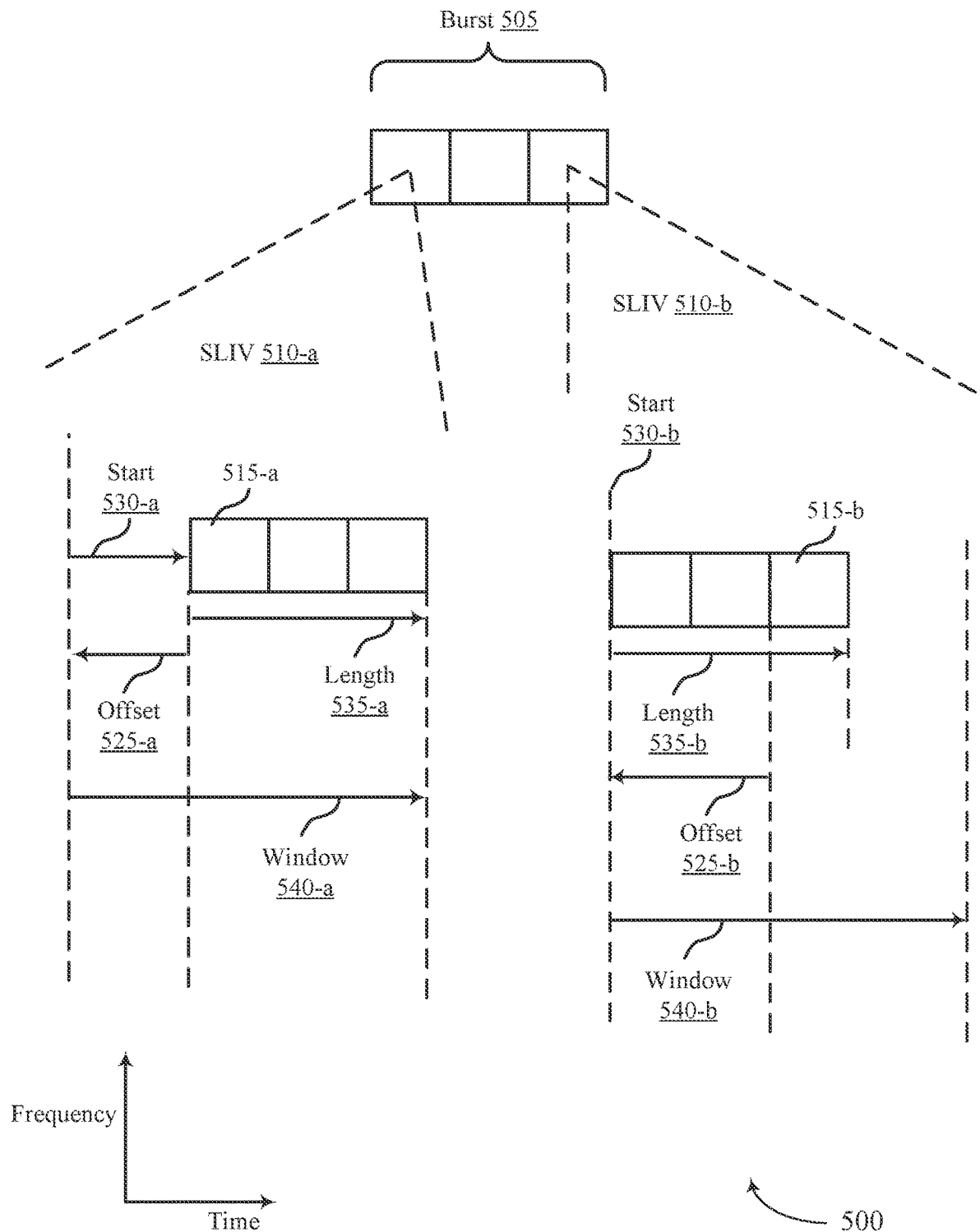

FIG. 5 illustrates an example of a resource scheme 500 that supports reservation techniques for aggregated sidelink communications in accordance with aspects of the present disclosure. The resource scheme 500 may implement, or be implemented by, aspects of wireless communications system 100, the wireless communications system 200, the resource schemes 300, the resource scheme 400, or any combination thereof. In some examples, the resource scheme 500 may represent a scheme used by a UE 115 (e.g., a transmitting UE 115) to reserve sidelink resources for transmitting a burst of aggregated sidelink messages as described herein. The UE 115 may communicate with one or more other UEs 115 using resource elements 515 (e.g., time and frequency resources) in a resource pool over a sidelink channel (e.g., a sidelink pool as described with reference to FIG. 2). The UE 115 and the one or more other UEs 115 may be examples of the UEs 115 described with reference to FIGS. 1-4.

Generally, the resource scheme 500 may illustrate example configurations of offsets 525 and windows 540, and examples of SLIVs 510 of SCIs that indicate the burst 505 of aggregated sidelink messages (e.g., the resources for the burst 505) with respect to the configured offsets 525 and windows 540. In the following illustrative examples, a threshold quantity of aggregated messages (e.g., a maximum allowed PSSCH aggregation) in the resource pool may be represented as A and may be an example of 3 (e.g., the burst 505 may include up to 3 TTIs for PSSCH repetitions), though any quantity may be used for A. In some examples, UEs 115 may identify one or more rules for reserving ills for aggregated sidelink messages (e.g., the burst 505). The one or more rules may indicate to implement one or more aspects of the resource scheme 500 in addition or alternative to other configurations, schemes, and techniques as described herein.

First SCI of a first sidelink control reservation message may indicate the initial resource element 515-*a* of the burst 505 (e.g., the message may reserve the resource element 515-*a* of the burst 505). The same or another control reservation message may include the SLIV 510-*a* indicating the start 530-*a* and the length 535-*a* of the burst 505 with respect to the index of the resource element 515-*a*, the configured offset 525-*a*, the configured window 540-*a*, or any combination thereof. Additionally or alternatively, second SCI of a second sidelink control reservation message may indicate the last resource element 515-*b* of the burst 505 (e.g., the message may reserve the resource element 515-*b* of the burst 505). The same or another control reservation message may include the ATV 510-*b* indicating the start 530-*b* and the length 535-*b* of the burst 505 with respect to the index of the resource element 515-*b*, the configured offset 525-*b*, the configured window 540-*b*, or any combination thereof. Although not shown for illustrative clarity, additional SCI of additional sidelink control reservation messages may indicate other resource elements 515 of the burst 505.

In some examples, the offset 525-*a* and the offset 525-*b* may be a same quantity of TTIs. For example, a UE 115 may identify one or more parameters indicating the value of the offset 525 for each of the SLIVs 510. The value of the offsets 525 may be represented by the example equation O=A−1. For example, when A is 3, the offset 525-*a* and the offset 525-*b* may be 2 and the start 530 of the burst 505 may be with respect to the offset 525 for a respective SLIV 510. As an illustrative example, the SUV 510-*a* may have a start 530-*a* of 2 and an offset 525-*a* of 2, indicating that the initial TTI for the burst 505 is the resource element 515-*a*. As another example, the SLIV 510-*b* may have a start 530-*a* of 0 and an offset 525-*b* of 2, indicating that the initial TTI for the burst 505 is the resource element 515-*a* (e.g., two TTIs prior to the current slot index of the resource element 515-*b*).

In some examples, the window 540-*a* and the window 540-*b* may be a same quantity of TTIs. For example, a UE 115 may identify one or more parameters indicating the value of the window 540 for each of the SLIVs 510. The value of the offsets 525 may be represented by the example equation W=2*A−1. For example, when A is 3, the window 540 may be 5, though any quantity or indication of the length of the windows 540, the offsets 525, or other parameters may be used.

Figure 6:
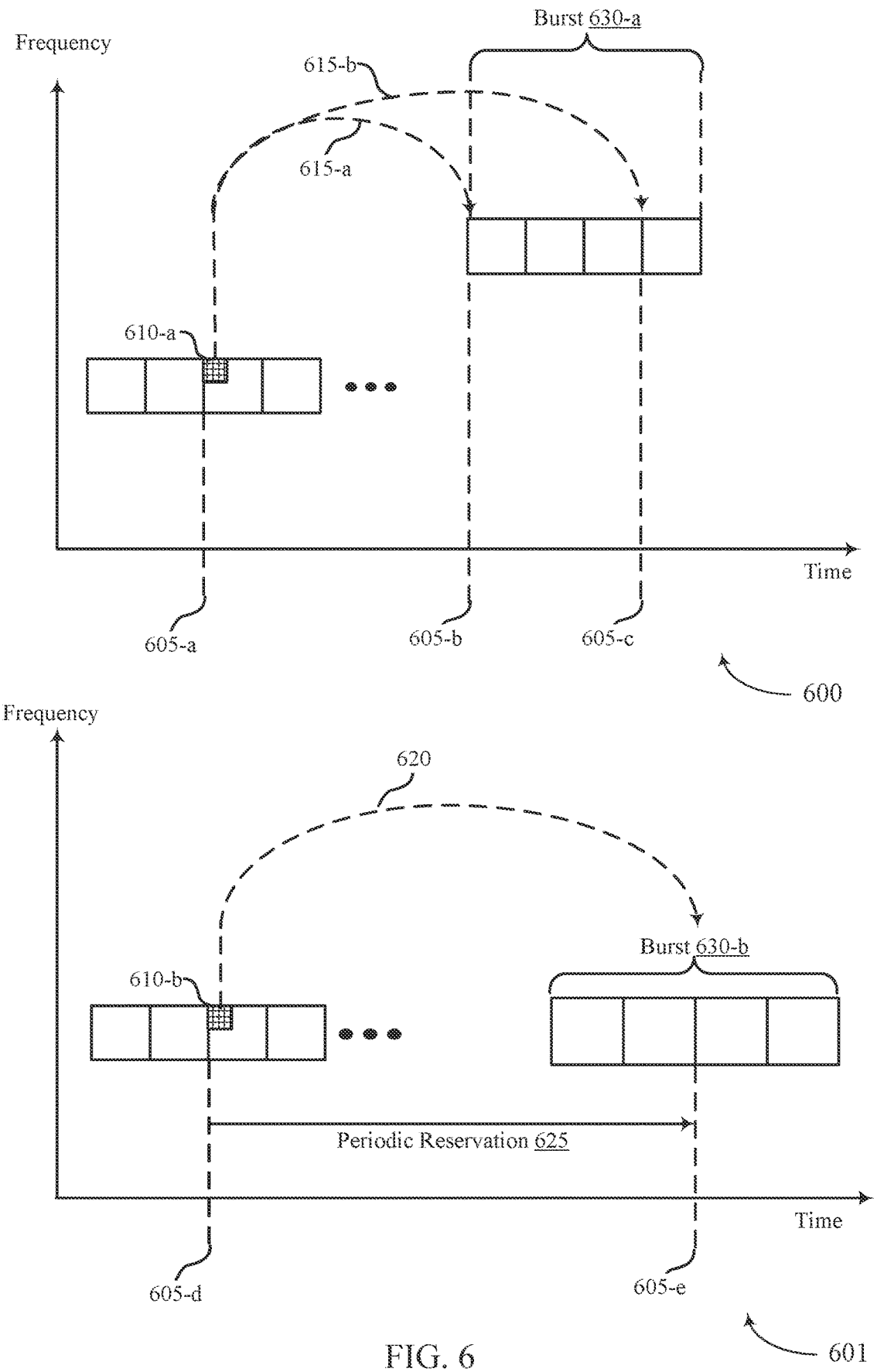

FIG. 6 illustrates an example of a resource scheme 600 and a resource scheme 601 that support reservation techniques for aggregated sidelink communications in accordance with aspects of the present disclosure. The resource schemes 600 and 601 may implement, or be implemented by, aspects of wireless communications system 100, the wireless communications system 200, the resource scheme 300, the resource scheme 400, the resource scheme 500, or any combination thereof. In some examples, the resource scheme 600 and the resource scheme 601 may represent schemes used by a UE 115 (e.g., a transmitting UE 115) to reserve sidelink resources for transmitting a burst of aggregated sidelink messages as described herein. The UE 115 may communicate with one or more other UEs 115 using resource elements (e.g., time and frequency resources) in a resource pool over a sidelink channel (e.g., a sidelink pool as described with reference to FIG. 2). The UE 115 and the one or more other UEs 115 may be examples of the UEs 115 described with reference to FIGS. 1-4.

In some examples, UEs 115 may identify one or more rules for reserving TTIs for aggregated sidelink messages (e.g., the bursts 630). The one or more rules may indicate to implement one or more aspects of the resource scheme 600, the resource scheme 601, or both, in addition or alternative to other configurations, schemes, and techniques as described herein.

Generally, the resource scheme 600 may represent an example scheme for using two reservations 615 to reserve a burst 630-*a* of a set of aggregated sidelink messages (e.g., PSSCH messages). For example, the SCI 610-*a* of the resource element starting at time 605-*a* may include or support two reservations 615. As one example, the reservation 615-*a* may indicate the first of the burst 630-*a* (e.g., the reservation 615-*a* may indicate the time 605-*b*) and the reservation 615-*b* may indicate the last TTI of the burst 630-*a* (e.g., the reservation 615-*b* may indicate the time 605-*c*). By indicating the first and last TTI of the burst 630-*a*, a receiving UE 115 may identify the length and start of the burst 630-*a*. As another example, the reservation 615-*a* may indicate a respective TTI of the burst 630-*a* (e.g., the reservation 615-*a* may be the third reservation message and this indicate the resources reserved for the third sidelink message in the burst 630-*a*) and the reservation 615-*b* may indicate the first TTI or the last TTI of the burst 630-*a* (e.g., the reservation 615-*b* may indicate the time 605-*b* or the time 605-*c*). In such examples, the SCI 610-*a* may include a bit indicating the burst length (e.g., a ceil(log 2(AL)) bit to indicate the length of the burst 630-*a*), which may enable a receiving UE 115 to identify the length, start, end, or any combination thereof of the burst 630-*a*.

Generally, the resource scheme 601 may represent an example scheme that supports or leverages periodic reservations for reserving resources for a burst 630-*b* of sidelink messages. For example, the SCI 610-*b* may include a first reservation 620 (e.g., a SLIV) and a periodic reservation 625. The periodic reservation 625 may indicate that the same frequency resources may be reserved with an indicated or configured periodicity (e.g., the SCI 610-*b* may reserve one or more periodic instances of sidelink resources, such as the TTI starting at time 605-*e*). In such resource pools supporting periodic reservations (e.g., semi-persistent scheduling (SPS) transmission), a sidelink UE may calculate an alternative SLIV and use it for the periodic reservation. For example, the UE may compute the SLIV using the current slot index (e.g., the slot index of the SCI 610-*b* at the time 605-*d*), instead of the slot index of a dynamically reserved TTI, to indicate the start and length of the burst 630-*b* with respect to the current slot index. In some examples, any other sensing UE 115 may use the SLIV to obtain the periodically reserved PSSCH burst 630-*b* as shown in resource scheme 601. In some examples, the UEs may use a one bit indication when reservation for dynamic aggregation (e.g., as described with reference, for example, to resource scheme 600 and resource scheme 400) and that for periodic aggregation (e.g., as described with reference to resource scheme 601) are both supported in the resource pool.

Figure 7:
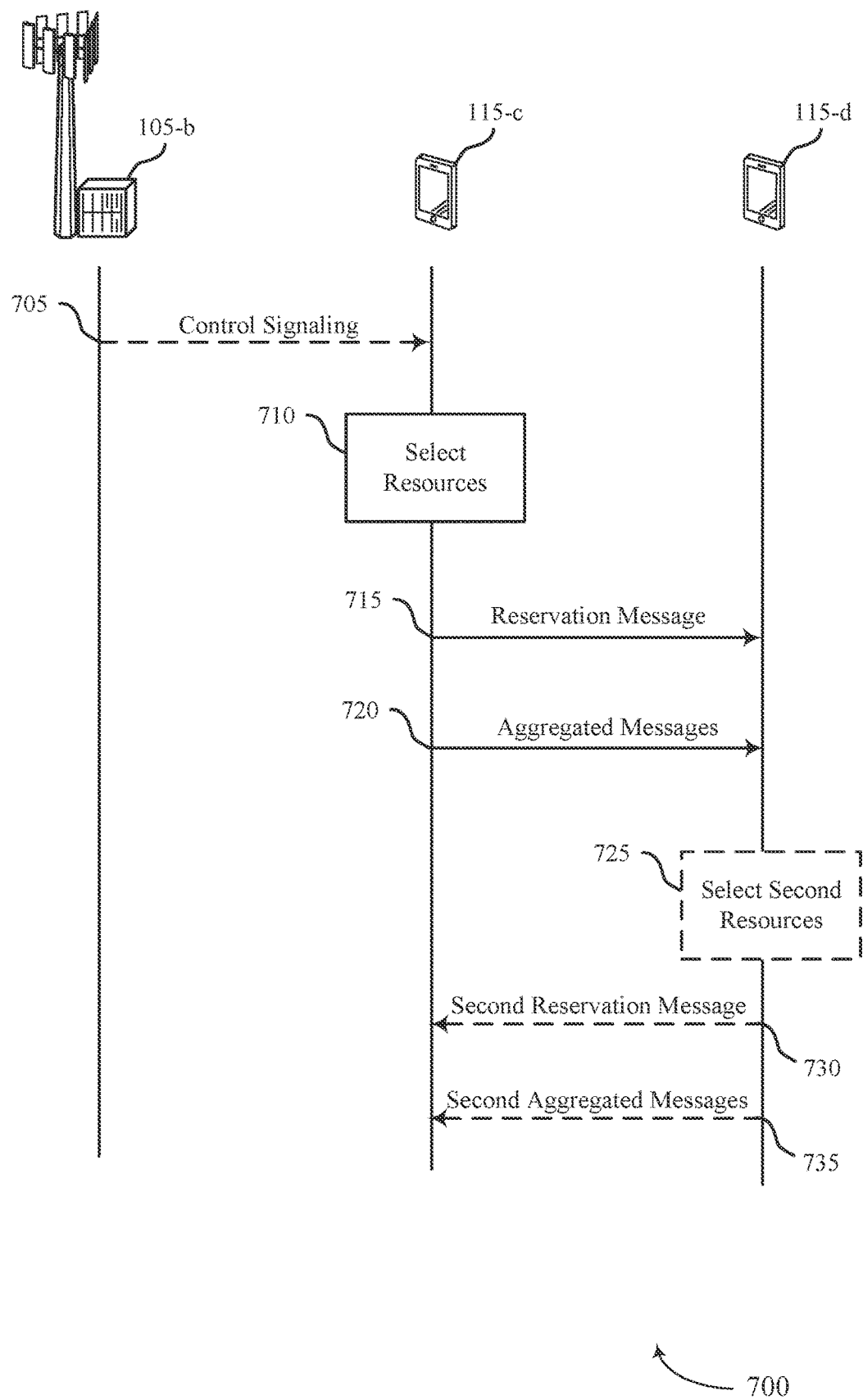
FIG. 7 illustrates an example of a process flow that supports reservation techniques for aggregated sidelink communications in accordance with aspects of the present disclosure.

FIG. 7 illustrates an example of a process flow 700 that supports reservation techniques for aggregated sidelink communications in accordance with aspects of the present disclosure. The process flow 700 may implement various aspects of the present disclosure described with reference to FIGS. 1-6. The process flow 700 may include a base station 105-*b*, a UE 115-*c*, and a UE 115-*d*, which may be examples of a base station 105 and UEs 115 as described with reference to FIGS. 1-6.

In the following description of the process flow 700, the operations between the UEs 115-*c*, 115-*d*, and the base station 105-*b* may be performed in different orders or at different times. Some operations may also be left out of the process flow 700, or other operations may be added. Although the base station 105-*b*, the UE 115-*c*, and the UE 115-*d* are shown performing the operations of the process flow 700, some aspects of some operations may also be performed by one or more other wireless devices.

In some examples, at 705 the UE 115-*c* may receive control signaling. In some cases, the UE 115-*c* may receive the control signaling from the base station 105-*b*, another UE 115 such as the UE 115-*d*, or a combination thereof. The control signaling may indicate one or more aggregated sidelink reservation rules for reserving time-contiguous TTIs (e.g., for communicating aggregated PSSCH messages), or the UE 115-*c* may be pre-configured with the one or more rules. For example, the UE 115-*c* may identify a rule to use for calculating a SLIV, one or more reservations indicating an initial or last TTI of a burst of sidelink messages, or any combination thereof for reserving sidelink reservations as described herein with reference to FIGS. 1-6. In some examples, the term "rule," "configuration," "scheme," and the like may be used interchangeably as described in the present disclosure. In some examples, the UE 115-*c* identifying the rule may include identifying an offset, a window, or a combination thereof (e.g., the control signaling may indicate values for the offset and window).

At 710, the UE 115-*c* may select resources for a set of aggregated sidelink messages. For example, the UE 115-*c* may select a set of time-contiguous TTIs (e.g., slots) for transmitting the set of aggregated sidelink messages. At 715, the UE 115-*c* may transmit a reservation message (e.g., a sidelink control reservation message) indicating the selected resources as described herein with reference to FIGS. 1-6. For example, the reservation message may indicate a respective TTI (e.g., a slot index), frequency, or both for a respective sidelink message of the set of aggregated sidelink messages. Additionally or alternatively, the reservation message may indicate a SLIV or otherwise indicate the length of the burst of sidelink messages, the start of the burst of sidelink messages, an end of the burst of sidelink message, or any combination thereof.

At 720, the UE 115-*c* may transmit the aggregated sidelink messages based on the reservation message. For example, the UE 115-*c* may transmit the aggregated messages to the UE 115-*d* or another UE 115 using the selected resources. In some examples, the UE 115-*d* may be an example of a target UE 115 for the messages or another UE 115 that the messages are not intended for reception.

In some examples, at 725 the UE 115-*d* may receive the reservation message and select second resources based on the message. For example, the UE 115-*d* may successfully decode at least one SCI corresponding to the reservation of the burst of aggregated messages and exclude the reserved resources from a set of available resource candidates. The UE 115-*d* may select different second resources that are in the set of available resource candidates.

In some examples, at 730 the UE 115-*d* may transmit a second reservation message, for example, in accordance with the one or more rules as described with respect to the UE 115-*c*. For example, the UE 115-*d* may transmit the second reservation message for the second resources, the second reservation message including or indicating a SLIV or the length of the burst of sidelink messages, the start of the burst of sidelink messages, an end of the burst of sidelink message, or any combination thereof. At 735, the UE 115-*d* may transmit a second set of aggregated messages on the second set of reserved resources.

Figure 8:
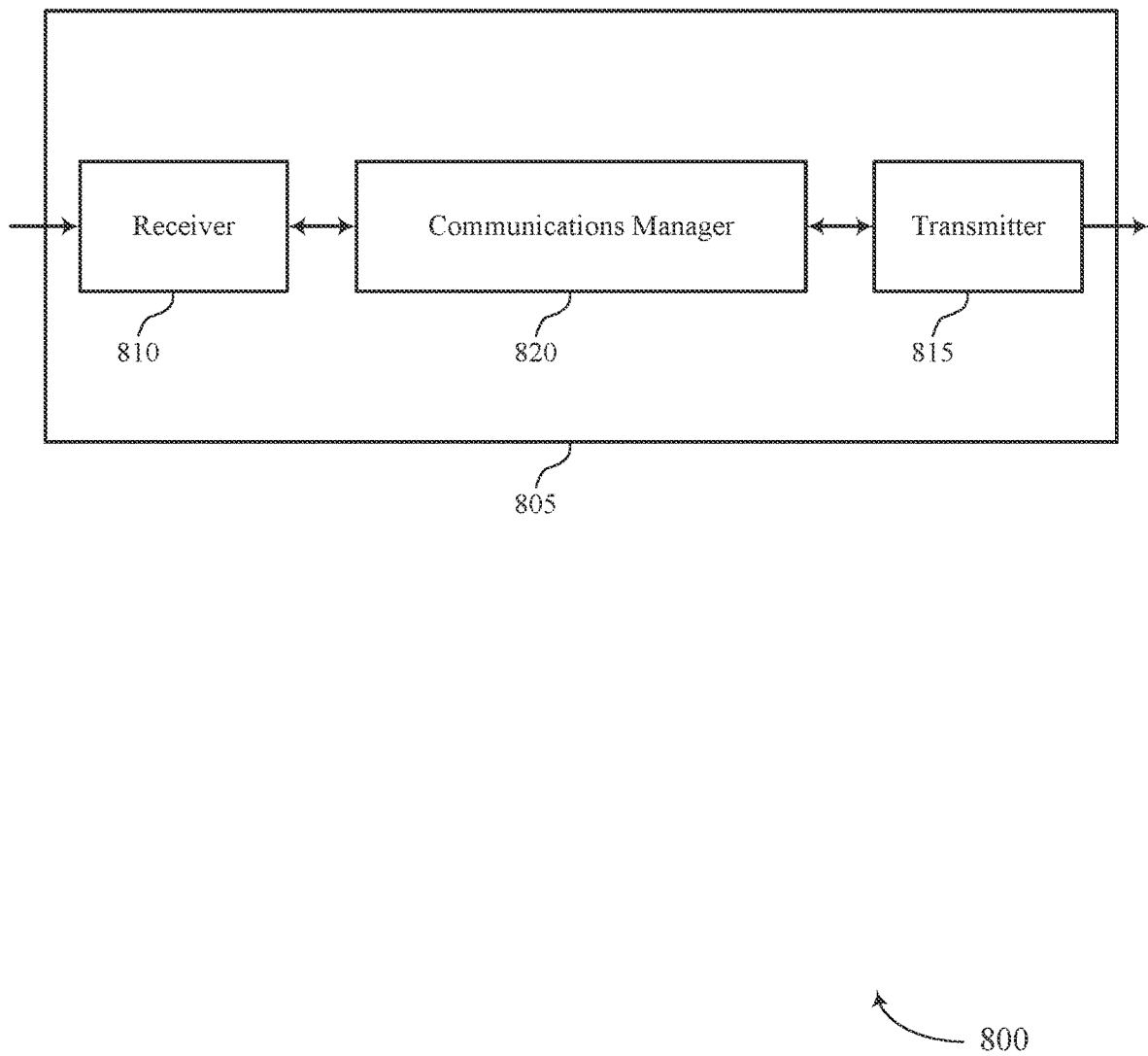
FIGS. 8 and 9 show block diagrams of devices that support reservation techniques for aggregated sidelink communications in accordance with aspects of the present disclosure.

FIG. 8 shows a block diagram 800 of a device 805 that supports reservation techniques for aggregated sidelink communications in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to reservation techniques for aggregated sidelink communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to reservation techniques for aggregated sidelink communications). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of reservation techniques for aggregated sidelink communications as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or inure of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. For example, the communications manager 820 may be configured as or otherwise support a means for receiving control signaling indicating an aggregated sidelink resource reservation rule for reserving time-contiguous transmission time intervals. The communications manager 820 may be configured as or otherwise support a means for transmitting, based on the aggregated sidelink resource reservation rule, a sidelink control reservation message indicating a starting transmission time interval for reserving a set of multiple time-contiguous transmission time intervals in a sidelink shared channel and a quantity of the set of multiple time-contiguous transmission time intervals reserved for transmission of a set of multiple aggregated sidelink messages. The communications manager 820 may be configured as or otherwise support a means for transmitting the set of multiple aggregated sidelink messages via the set of multiple time-contiguous transmission time intervals of the sidelink shared channel indicated in the sidelink control reservation message.

Additionally or alternatively, the communications manager 820 may support wireless communications at a UE in accordance with examples as disclosed herein. For example, the communications manager 820 may be configured as or otherwise support a means for receiving control signaling indicating an aggregated sidelink resource reservation rule for reserving time-contiguous transmission time intervals. The communications manager 820 may be configured as or otherwise support a means for receiving a sidelink control reservation message indicating a starting transmission time interval for reserving a set of multiple time-contiguous transmission time intervals in a sidelink shared channel and a quantity of the set of multiple time-contiguous transmission time intervals reserved for transmission of a set of multiple aggregated sidelink messages from a second UE based on the aggregated sidelink resource reservation rule. The communications manager 820 may be configured as or otherwise support a means for transmitting a second sidelink control reservation message indicating a second starting transmission time interval for reserving a second set of multiple time-contiguous transmission time intervals in the sidelink shared channel and a second quantity of the second set of multiple time-contiguous transmission time intervals reserved for transmission of a second set of multiple aggregated sidelink messages based as least in part on the aggregated sidelink resource reservation rule and the sidelink control reservation message. The communications manager 820 may be configured as or otherwise support a means for transmitting the second set of multiple aggregated sidelink messages via the second set of multiple time-contiguous transmission time intervals of the sidelink shared channel.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for aggregated sidelink communications as described herein. For example, the device 805 may support an indication (e.g., a SLIV or other indication) of a burst of aggregated sidelink messages, which may improve power efficiency, communications reliability (e.g., reduced interference), or any combination thereof at a processor level of the device 805 or other devices in the system, among other possible advantages.

Figure 9:
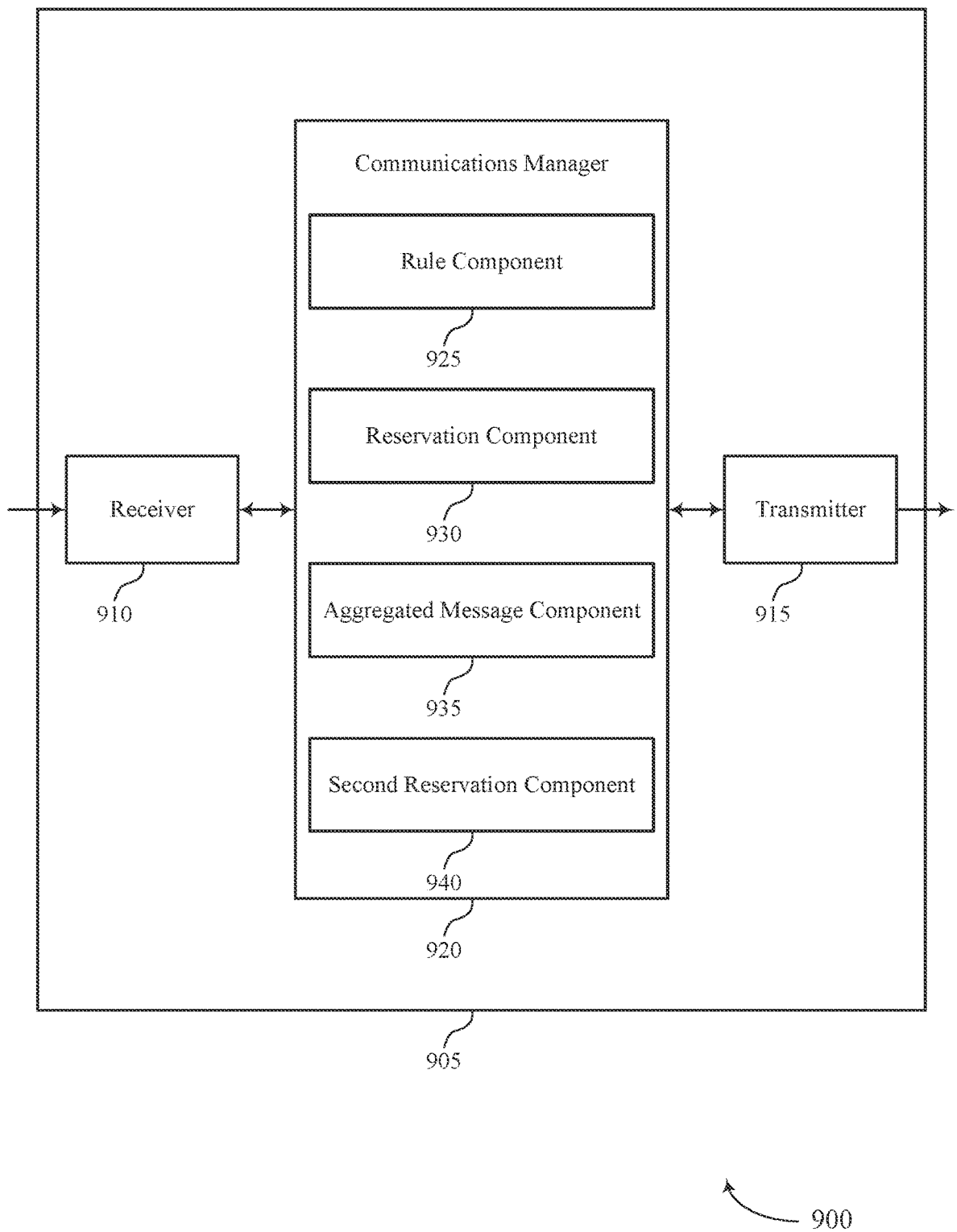

FIG. 9 shows a block diagram 900 of a device 905 that supports reservation techniques for aggregated sidelink communications in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to reservation techniques for aggregated sidelink communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to reservation techniques for aggregated sidelink communications). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of reservation techniques for aggregated sidelink communications as described herein. For example, the communications manager 920 may include a rule component 925, a reservation component 930, an aggregated message component 935, a second reservation component 940, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. The rule component 925 may be configured as or otherwise support a means for receiving control signaling indicating an aggregated sidelink resource reservation rule for reserving time-contiguous transmission time intervals. The reservation component 930 may be configured as or otherwise support a means for transmitting, based on the aggregated sidelink resource reservation rule, a sidelink control reservation message indicating a starting transmission time interval for reserving a set of multiple time-contiguous transmission time intervals in a sidelink shared channel and a quantity of the set of multiple time-contiguous transmission time intervals reserved for transmission of a set of multiple aggregated sidelink messages. The aggregated message component 935 may be configured as or otherwise support a means for transmitting the set of multiple aggregated sidelink messages via the set of multiple time-contiguous transmission time intervals of the sidelink shared channel indicated in the sidelink control reservation message.

Additionally or alternatively, the communications manager 920 may support wireless communications at a UE in accordance with examples as disclosed herein. The rule component 925 may be configured as or otherwise support a means for receiving control signaling indicating an aggregated sidelink resource reservation rule for reserving time-contiguous transmission time intervals. The reservation component 930 may be configured as or otherwise support a means for receiving a sidelink control reservation message indicating a starting transmission time interval for reserving a set of multiple time-contiguous transmission time intervals in a sidelink shared channel and a quantity of the set of multiple time-contiguous transmission time intervals reserved for transmission of a set of multiple aggregated sidelink messages from a second UE based on the aggregated sidelink resource reservation rule. The second reservation component 940 may be configured as or otherwise support a means for transmitting a second sidelink control reservation message indicating a second starting transmission time interval for reserving a second set of multiple time-contiguous transmission time intervals in the sidelink shared channel and a second quantity of the second set of multiple time-contiguous transmission time intervals reserved for transmission of a second set of multiple aggregated sidelink messages based as least in part on the aggregated sidelink resource reservation rule and the sidelink control reservation message. The aggregated message component 935 may be configured as or otherwise support a means for transmitting the second set of multiple aggregated sidelink messages via the second set of multiple time-contiguous transmission time intervals of the sidelink shared channel.

Figure 10:
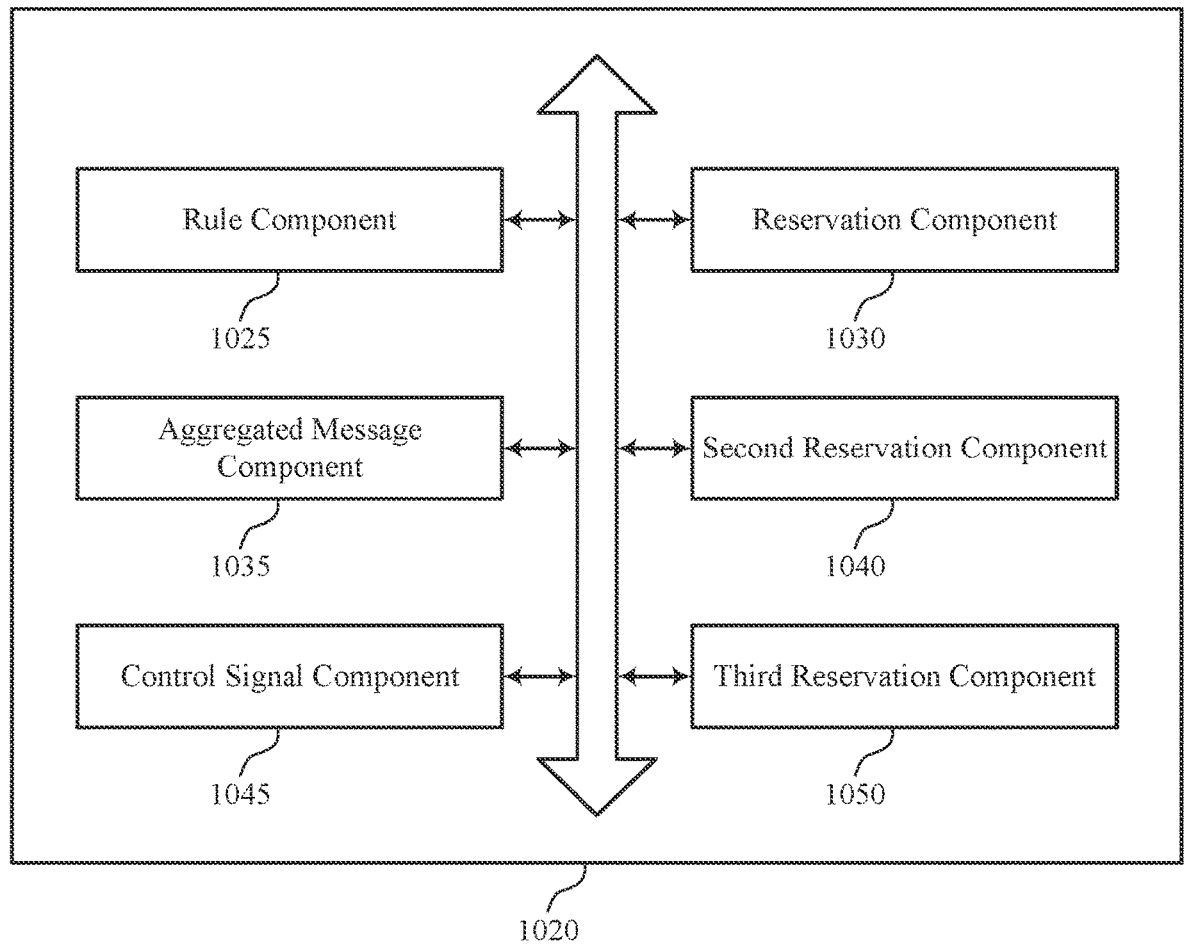
FIG. 10 shows a block diagram of a communications manager that supports reservation techniques for aggregated sidelink communications in accordance with aspects of the present disclosure.

FIG. 10 shows a block diagram 1000 of a communications manager 1020 that supports reservation techniques for aggregated sidelink communications in accordance with aspects of the present disclosure. The communications manager 1020 may be an example of aspects of a communications manager 820, a communications manager 920, or both, as described herein. The communications manager 1020, or various components thereof, may be an example of means for performing various aspects of reservation techniques for aggregated sidelink communications as described herein. For example, the communications manager 1020 may include a rule component 1025, a reservation component 1030, an aggregated message component 1035, a second reservation component 1040, a control signal component 1045, a third reservation component 1050, or any combination thereof. Each of these components may communicate, directly or indirectly, with one another (e.g., via one or more buses).

The communications manager 1020 may support wireless communications at a UE in accordance with examples as disclosed herein. The rule component 1025 may be configured as or otherwise support a means for receiving control signaling indicating an aggregated sidelink resource reservation rule for reserving time-contiguous transmission time intervals. The reservation component 1030 may be configured as or otherwise support a means for transmitting, based on the aggregated sidelink resource reservation rule, a sidelink control reservation message indicating a starting transmission time interval for reserving a set of multiple time-contiguous transmission time intervals in a sidelink shared channel and a quantity of the set of multiple time-contiguous transmission time intervals reserved for transmission of a set of multiple aggregated sidelink messages. The aggregated message component 1035 may be configured as or otherwise support a means for transmitting the set of multiple aggregated sidelink messages via the set of multiple time-contiguous transmission time intervals of the sidelink shared channel indicated in the sidelink control reservation message.

In some examples, the control signal component 1045 may be configured as or otherwise support a means for receiving control signaling that indicates a time duration window associated with the sidelink shared channel and an offset for the time duration window.

In some examples, to support transmitting the sidelink control reservation message, the reservation component 1030 may be configured as or otherwise support a means for transmitting the sidelink control reservation message indicating the starting transmission time interval within the time duration window relative to the offset.

In some examples, to support transmitting the set of multiple aggregated sidelink messages, the aggregated message component 1035 may be configured as or otherwise support a means for transmitting the set of multiple aggregated sidelink messages within the time duration window relative to the starting transmission time interval.

In some examples, the reservation component 1030 may be configured as or otherwise support a means for transmitting the sidelink control reservation message that includes a quantity of bits selected based on the starting transmission time interval and the quantity of the set of multiple time-contiguous transmission time intervals.

In some examples, the quantity of bits is selected based on the quantity of the set of multiple time-contiguous transmission time intervals satisfying a threshold.

In some examples, the second reservation component 1040 may be configured as or otherwise support a means for transmitting a second sidelink control reservation message indicating a first sidelink message of the set of multiple aggregated sidelink messages.

In some examples, the sidelink control reservation message includes an indication that the sidelink control reservation message is associated with the second sidelink control reservation message.

In some examples, the aggregated sidelink resource reservation rule indicates that the sidelink control reservation message is associated with the second sidelink control reservation message.

In some examples, the reservation component 1030 may be configured as or otherwise support a means for transmitting the sidelink control reservation message that indicates the starting transmission time interval. In some examples, the second reservation component 1040 may be configured as or otherwise support a means for transmitting a second sidelink control reservation message indicating an ending transmission time interval of the set of multiple time-contiguous transmission time intervals, where a difference between the starting transmission time interval and the ending transmission time interval indicates the quantity of the set of multiple time-contiguous transmission time intervals.

In some examples, the reservation component 1030 may be configured as or otherwise support a means for transmitting the sidelink control reservation message that indicates the starting transmission time interval and the quantity of the set of multiple time-contiguous transmission time intervals with respect to a current transmission time interval index in which the sidelink control reservation message is transmitted in a periodic resource.

In some examples, the reservation component 1030 may be configured as or otherwise support a means for transmitting the sidelink control reservation message that includes an indication that the starting transmission time interval and the quantity of the set of multiple time-continuous transmission time intervals are respective to a transmission time interval index of one of a periodic resource or a dynamic resource.

In some examples, to support receiving the control signaling, the rule component 1025 may be configured as or otherwise support a means for receiving the control signaling indicating the aggregated sidelink resource reservation rule that indicates a rule for calculating the starting transmission time interval, the quantity of the set of multiple time-contiguous transmission time intervals, or both, based on a configured offset, a time duration window, or both.

In some examples, to support receiving the control signaling, the rule component 1025 may be configured as or otherwise support a means for receiving the control signaling indicating the aggregated sidelink resource reservation rule that indicates a rule for calculating the starting transmission time interval, the quantity of the set of multiple time-contiguous transmission time intervals, or both, based on a periodic resource pool.

Additionally or alternatively, the communications manager 1020 may support wireless communications at a UE in accordance with examples as disclosed herein. In some examples, the rule component 1025 may be configured as or otherwise support a means for receiving control signaling indicating an aggregated sidelink resource reservation rule for reserving time-contiguous transmission time intervals. In some examples, the reservation component 1030 may be configured as or otherwise support a means for receiving a sidelink control reservation message indicating a starting transmission time interval for reserving a set of multiple time-contiguous transmission time intervals in a sidelink shared channel and a quantity of the set of multiple time-contiguous transmission time intervals reserved for transmission of a set of multiple aggregated sidelink messages from a second UE based on the aggregated sidelink resource reservation rule. The second reservation component 1040 may be configured as or otherwise support a means for transmitting a second sidelink control reservation message indicating a second starting transmission time interval for reserving a second set of multiple time-contiguous transmission time intervals in the sidelink shared channel and a second quantity of the second set of multiple time-contiguous transmission time intervals reserved for transmission of a second set of multiple aggregated sidelink messages based as least in part on the aggregated sidelink resource reservation rule and the sidelink control reservation message. In some examples, the aggregated message component 1035 may be configured as or otherwise support a means for transmitting the second set of multiple aggregated sidelink messages via the second set of multiple time-contiguous transmission time intervals of the sidelink shared channel.

In some examples, the control signal component 1045 may be configured as or otherwise support a means for receiving control signaling that indicates a time duration window associated with the sidelink shared channel and an offset of the time duration window.

In some examples, to support transmitting the second sidelink control reservation message, the second reservation component 1040 may be configured as or otherwise support a means for transmitting the second sidelink control reservation message indicating the starting transmission time interval within the time duration window relative to the offset.

In some examples, to support transmitting the second set of multiple aggregated sidelink messages, the second reservation component 1040 may be configured as or otherwise support a means for transmitting the second set of multiple aggregated sidelink messages within the time duration window relative to the starting transmission time interval.

In some examples, the second reservation component 1040 may be configured as or otherwise support a means for transmitting the second sidelink control reservation message that includes a quantity of bits selected based on the starting transmission time interval and the quantity of the second set of multiple time-contiguous transmission time intervals.

In some examples, the quantity of bits is selected based on the quantity of the second set of multiple time-contiguous transmission time intervals satisfying a threshold.

In some examples, the third reservation component 1050 may be configured as or otherwise support a imams for transmitting a third sidelink control reservation message indicating a first sidelink message of the second set of multiple aggregated sidelink messages.

In some examples, the second sidelink control reservation message includes an indication that the second sidelink control reservation message is associated with the third sidelink control reservation message.

In some examples, the aggregated sidelink resource reservation rule indicates that the second sidelink control reservation message is associated with the third sidelink control reservation message.

In some examples, the reservation component 1030 may be configured as or otherwise support a means for receiving the sidelink control reservation message that indicates the starting transmission time interval. In some examples, the third reservation component 1050 may be configured as or otherwise support a means for receiving a third sidelink control reservation message indicating an ending transmission time interval of the set of multiple tithe-contiguous transmission time intervals, where a difference between the starting transmission time interval and the ending transmission time interval indicates the quantity of the set of multiple time-contiguous transmission time intervals.

In some examples, the second reservation component 1040 may be configured as or otherwise support a means for transmitting the second sidelink control reservation message that indicates the starting transmission time interval and the quantity of the transmitting set of multiple time-contiguous transmission time intervals with respect to a current transmission time interval index in which the second sidelink control reservation message is transmitted in a periodic resource.

In some examples, the second reservation component 1040 may be configured as or otherwise support a means for transmitting the second sidelink control reservation message that includes an indication that the starting transmission time interval and the quantity of the set of multiple time-contiguous transmission time intervals are respective to a transmission time interval index of one of a periodic resource or a dynamic resource.

In some examples, to support receiving the control signaling, the rule component 1025 may be configured as or otherwise support a means for receiving the control signaling indicating the aggregated sidelink resource reservation rule that indicates a rule for calculating the second starting transmission time interval, the quantity of the second set of multiple time-contiguous transmission time intervals, or both, based on a configured offset, a time duration window, or both.

In some examples, to support receiving the control signaling, the rule component 1025 may be configured as or otherwise support a means for receiving the control signaling indicating the aggregated sidelink resource reservation rule that indicates a rule for calculating the second starting transmission time interval, the quantity of the second set of multiple time-contiguous transmission time intervals, or both, based on a periodic resource pool.

Figure 11:
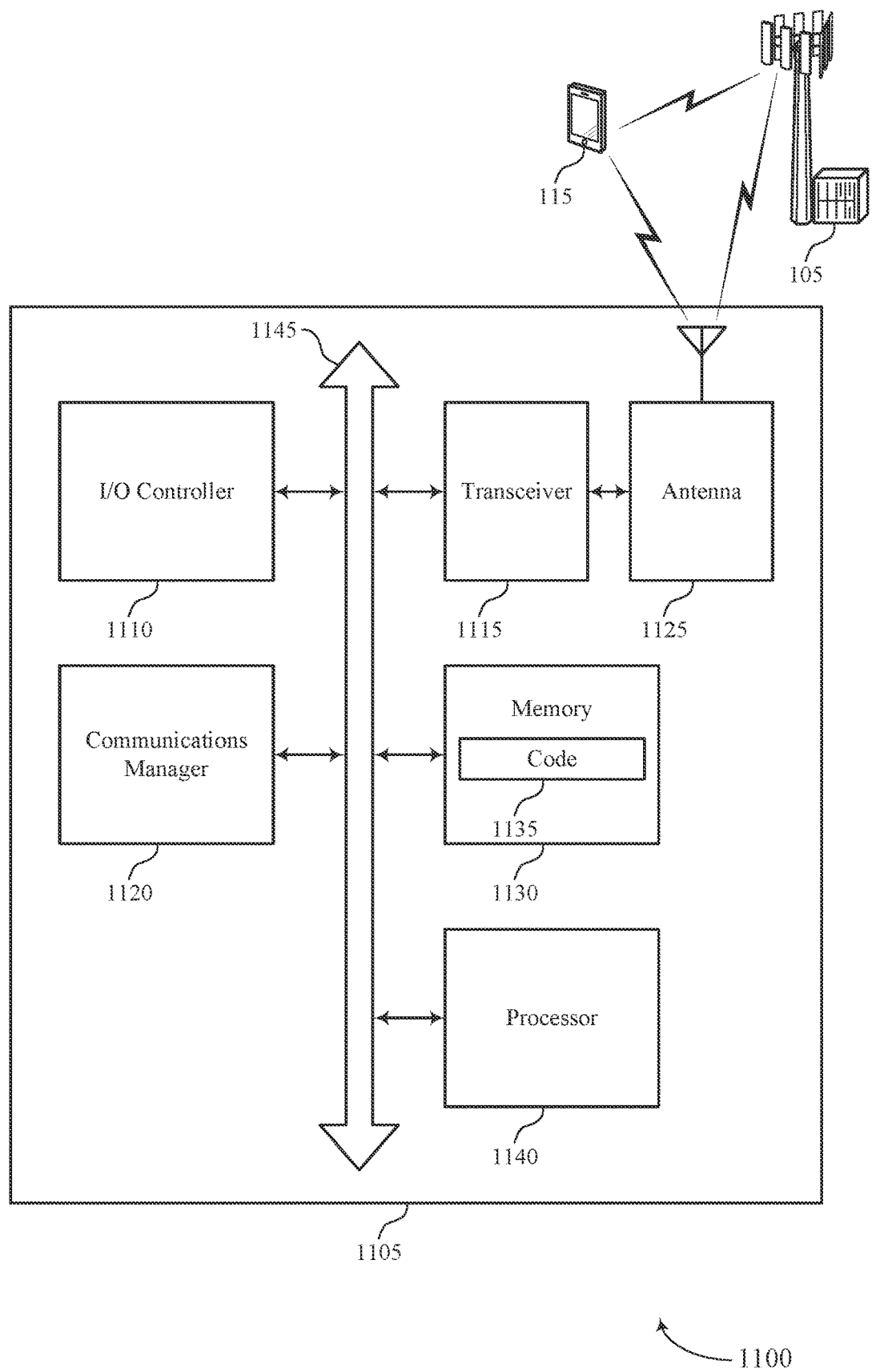
FIG. 11 shows a diagram of a system including a device that supports reservation techniques for aggregated sidelink communications in accordance with aspects of the present disclosure.

FIG. 11 shows a diagram of a system 1100 including a device 1105 that supports reservation techniques for aggregated sidelink communications in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting reservation techniques for aggregated sidelink communications). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at UE in accordance with examples as disclosed herein. For example, the communications manager 1120 may be configured as or otherwise support a means for receiving control signaling indicating an aggregated sidelink resource reservation rule for reserving time-contiguous transmission time intervals. The communications manager 1120 may be configured as or otherwise support a means for transmitting, based on the aggregated sidelink resource reservation rule, a sidelink control reservation message indicating a starting transmission time interval for reserving a set of multiple time-contiguous transmission time intervals in a sidelink shared channel and a quantity of the set of multiple time-contiguous transmission time intervals reserved for transmission of a set of multiple aggregated sidelink messages. The communications manager 1120 may be configured as or otherwise support a means for transmitting the set of multiple aggregated sidelink messages via the set of multiple time-contiguous transmission time intervals of the sidelink shared channel indicated in the sidelink control reservation message.

Additionally or alternatively, the communications manager 1120 may support wireless communications at a UE in accordance with examples as disclosed herein. For example, the communications manager 1120 may be configured as or otherwise support a means for receiving control signaling indicating an aggregated sidelink resource reservation rule for reserving time-contiguous transmission time intervals. The communications manager 1120 be configured as or otherwise support a means for receiving a sidelink control reservation message indicating a starting transmission time interval for reserving a set of multiple time-contiguous transmission time intervals in a sidelink shared channel and a quantity of the set of multiple time-contiguous transmission time intervals reserved for transmission of a set of multiple aggregated sidelink messages from a second UE based on the aggregated sidelink resource reservation rule. The communications manager 1120 may be configured as or otherwise support a means for transmitting a second sidelink control reservation message indicating a second starting transmission time interval for reserving a second set of multiple time-contiguous transmission time intervals in the sidelink shared channel and a second quantity of the second set of multiple time-contiguous transmission time intervals reserved for transmission of a second set of multiple aggregated sidelink messages based as least in part on the aggregated sidelink resource reservation rule and the sidelink control reservation message. The communications manager 1120 may be configured as or otherwise support a means for transmitting the second set of multiple aggregated sidelink messages via the second set of multiple time-contiguous transmission time intervals of the sidelink shared channel.

By including or configuring the communications manager 1120 in accordance with examples as described herein, the device 1105 may support techniques for may support techniques for aggregated sidelink communications as described herein. For example, the device 805 may support an indication (e.g., a SLIV or other indication) of a burst of aggregated sidelink messages, which may improve power efficiency, communications reliability (e.g., reduced interference), or any combination thereof at the device 805 or at other devices in the system, among other possible advantages.

In some examples, the communications manager 1120 may be configured to perform various operations e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of reservation techniques for aggregated sidelink communications as described herein, or the processor 1140 and the memory 1130 may be otherwise configured to perform or support such operations.

Figure 12:
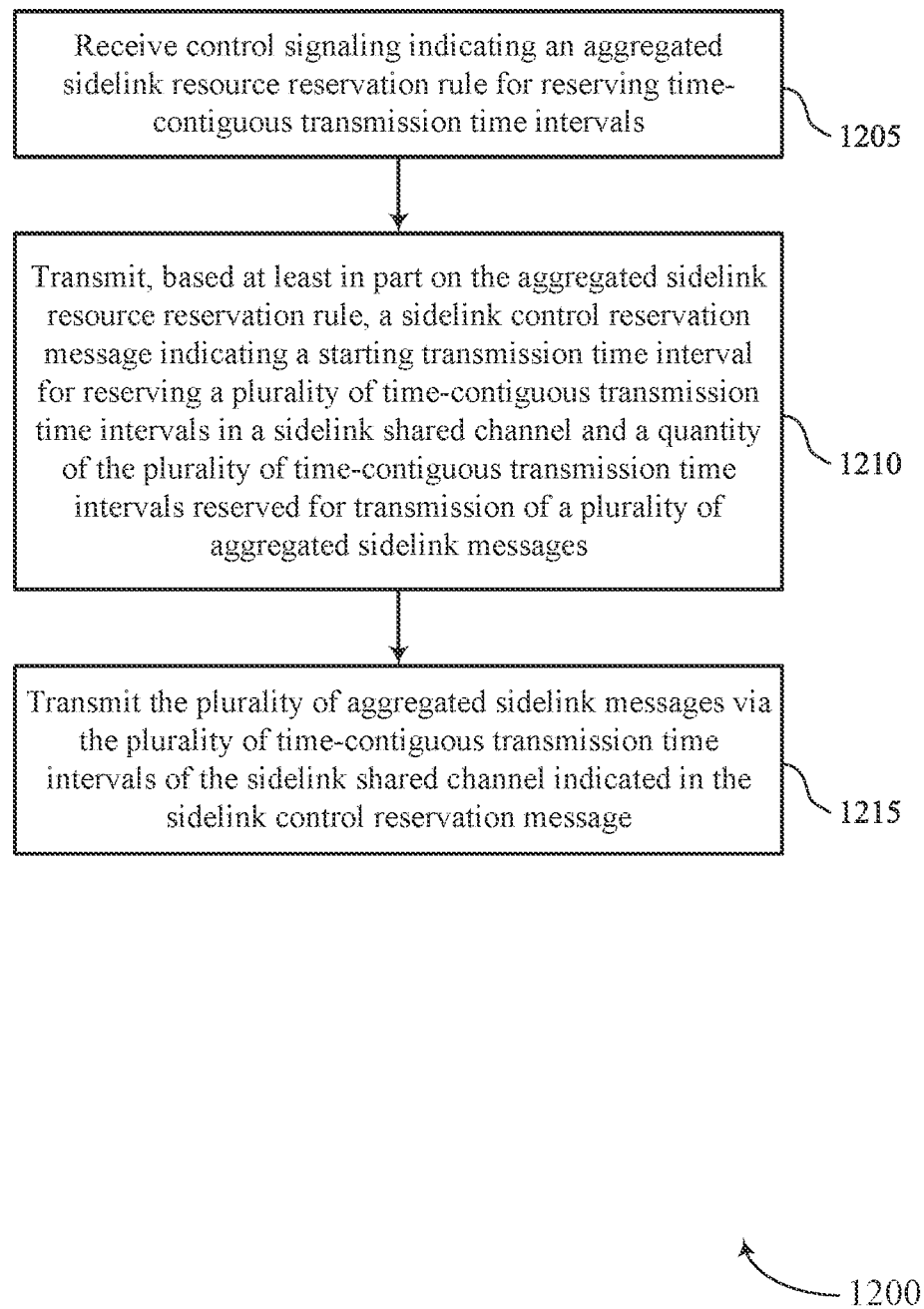
FIGS. 12 through 15 show flowcharts illustrating methods that support reservation techniques for aggregated sidelink communications in accordance with aspects of the present disclosure.

FIG. 12 shows a flowchart illustrating a method 1200 that supports reservation techniques for aggregated sidelink communications in accordance with aspects of the present disclosure. The operations of the method 1200 may be implemented by a UE or its components as described herein. For example, the operations of the method 1200 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1205, the method may include receiving control signaling indicating an aggregated sidelink resource reservation rule for reserving time-contiguous transmission time intervals. The operations of 1205 may be performed in accordance with examples as disclosed herein. In some examples, aspects of the operations of 1205 may be performed by a rule component 1025 as described with reference to FIG. 10.

At 1210, the method may include transmitting, based on the aggregated sidelink resource reservation rule, a sidelink control reservation message indicating a starting transmission time interval for reserving a set of multiple time-contiguous transmission time intervals in a sidelink shared channel and a quantity of the set of multiple time-contiguous transmission time intervals reserved for transmission of a set of multiple aggregated sidelink messages. The operations of 1210 may be performed in accordance with examples as disclosed herein. In some examples, aspects of the operations of 1210 may be performed by a reservation component 1030 as described with reference to FIG. 10.

At 1215, the method may include transmitting the set of multiple aggregated sidelink messages via, the set of multiple time-contiguous transmission time intervals of the sidelink shared channel indicated in the sidelink control reservation message. The operations of 1215 may be performed in accordance with examples as disclosed herein. In some examples, aspects of the operations of 1215 may be performed by an aggregated message component 1035 as described with reference to FIG. 10.

Figure 13:
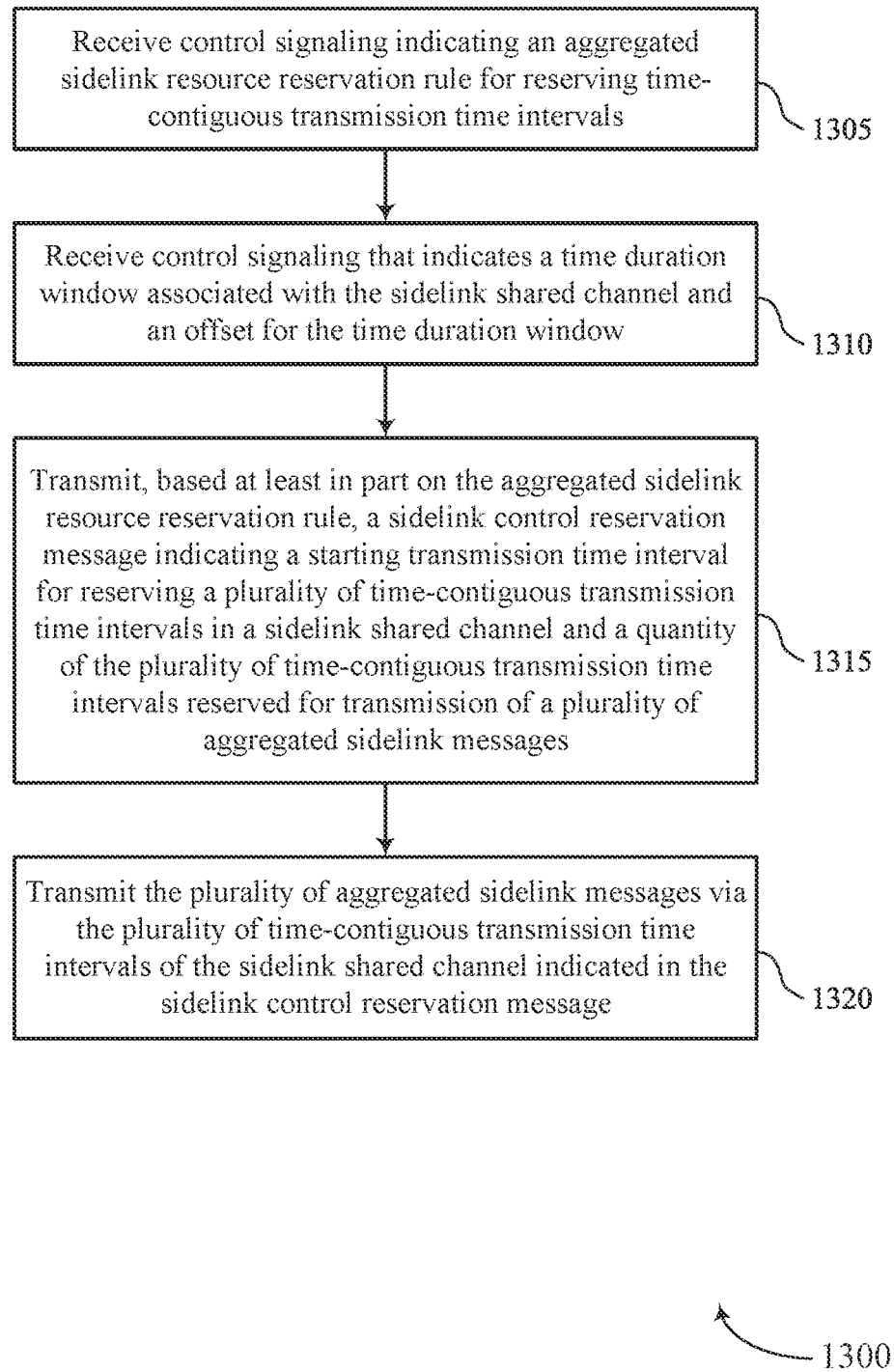

FIG. 13 shows a flowchart illustrating a method 1300 that supports reservation techniques for aggregated sidelink communications in accordance with aspects of the present disclosure. The operations of the method 1300 may be implemented by a UE or its components as described herein. For example, the operations of the method 1300 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1305, the method may include receiving control signaling indicating an aggregated sidelink resource reservation rule for reserving time-contiguous transmission nine intervals. The operations of 1305 may be performed in accordance with examples as disclosed herein. In some examples, aspects of the operations of 1305 may be performed by a rule component 1025 as described with reference to FIG. 10.

At 1310, the method may include receiving control signaling that indicates a time duration window associated with the sidelink shared channel and an offset for the time duration window. The operations of 1310 may be performed in accordance with examples as disclosed herein. In some examples, aspects of the operations of 1310 may be performed by a control signal component 1045 as described with reference to FIG. 10.

At 1315, the method may include transmitting, based on the aggregated sidelink resource reservation rule, a sidelink control reservation message indicating a starting transmission time interval for reserving a set of multiple time-contiguous transmission time intervals in a sidelink shared channel and a quantity of the set of multiple time-contiguous transmission time intervals reserved for transmission of a set of multiple aggregated sidelink messages. The operations of 1315 may be performed in accordance with examples as disclosed herein. In some examples, aspects of the operations of 1315 may be performed by a reservation component 1030 as described with reference to FIG. 10.

At 1320, the method may include transmitting the set of multiple aggregated sidelink messages via the set of multiple time-contiguous transmission time intervals of the sidelink shared channel indicated in the sidelink control reservation message. The operations of 1320 may be performed in accordance with examples as disclosed herein. In some examples, aspects of the operations of 1320 may be performed by an aggregated message component 1035 as described with reference to FIG. 10.

Figure 14:
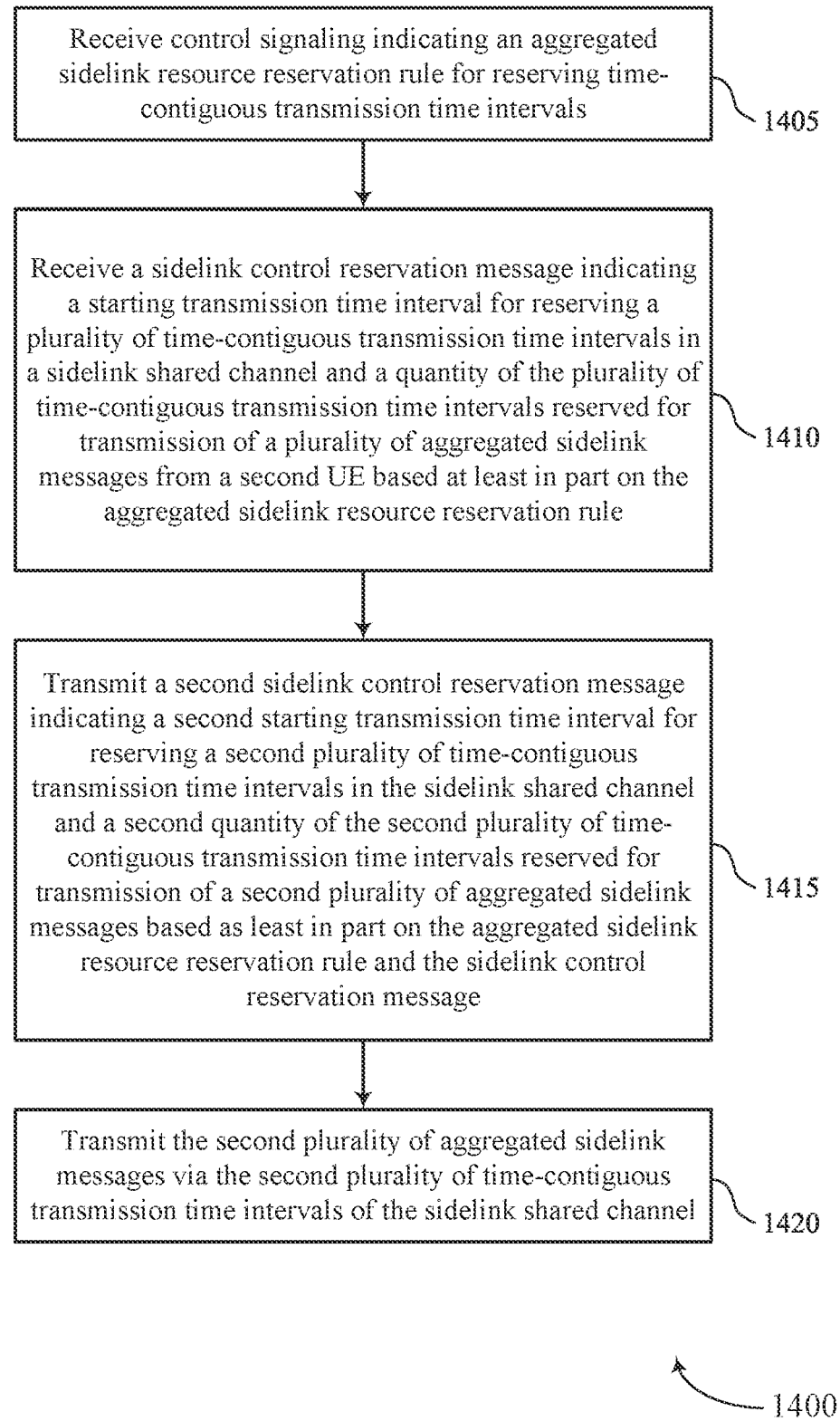

FIG. 14 shows a flowchart illustrating a method 1400 that supports reservation techniques for aggregated sidelink communications in accordance with aspects of the present disclosure. The operations of the method 1400 may be implemented by a UE or its components as described herein. For example, the operations of the method 1400 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1405, the method may include receiving control signaling indicating an aggregated sidelink resource reservation rule for reserving time-contiguous transmission time intervals. The operations of 1405 may be performed in accordance with examples as disclosed herein. In some examples, aspects of the operations of 1405 may be performed by a rule component 1025 as described with reference to FIG. 10.

At 1410, the method may include receiving a sidelink control reservation message indicating a starting transmission time interval for reserving a set of multiple time-contiguous transmission time intervals in a sidelink shared channel and a quantity of the set of multiple time-contiguous transmission time intervals reserved for transmission of a set of multiple aggregated sidelink messages from a second UE based on the aggregated sidelink resource reservation rule. The operations of 1410 may be performed in accordance with examples as disclosed herein. In some examples, aspects of the operations of 1410 may be performed by a reservation component 1030 as described with reference to FIG. 10.

At 1415, the method may include transmitting a second sidelink control reservation message indicating a second starting transmission time interval for reserving a second set of multiple time-contiguous transmission time intervals in the sidelink shared channel and a second quantity of the second set of multiple time-contiguous transmission time intervals reserved for transmission of a second set of multiple aggregated sidelink messages based as least in part on the aggregated sidelink resource reservation rule and the sidelink control reservation message. The operations of 1415 may be performed in accordance with examples as disclosed herein. In some examples, aspects of the operations of 1415 may be performed by a second reservation component 1040 as described with reference to FIG. 10.

At 1420, the method may include transmitting the second set of multiple aggregated sidelink messages via the second set of multiple time-contiguous transmission time intervals of the sidelink shared channel. The operations of 1420 may be performed in accordance with examples as disclosed herein. In some examples, aspects of the operations of 1420 may be performed by an aggregated message component 1035 as described with reference to FIG. 10.

Figure 15:
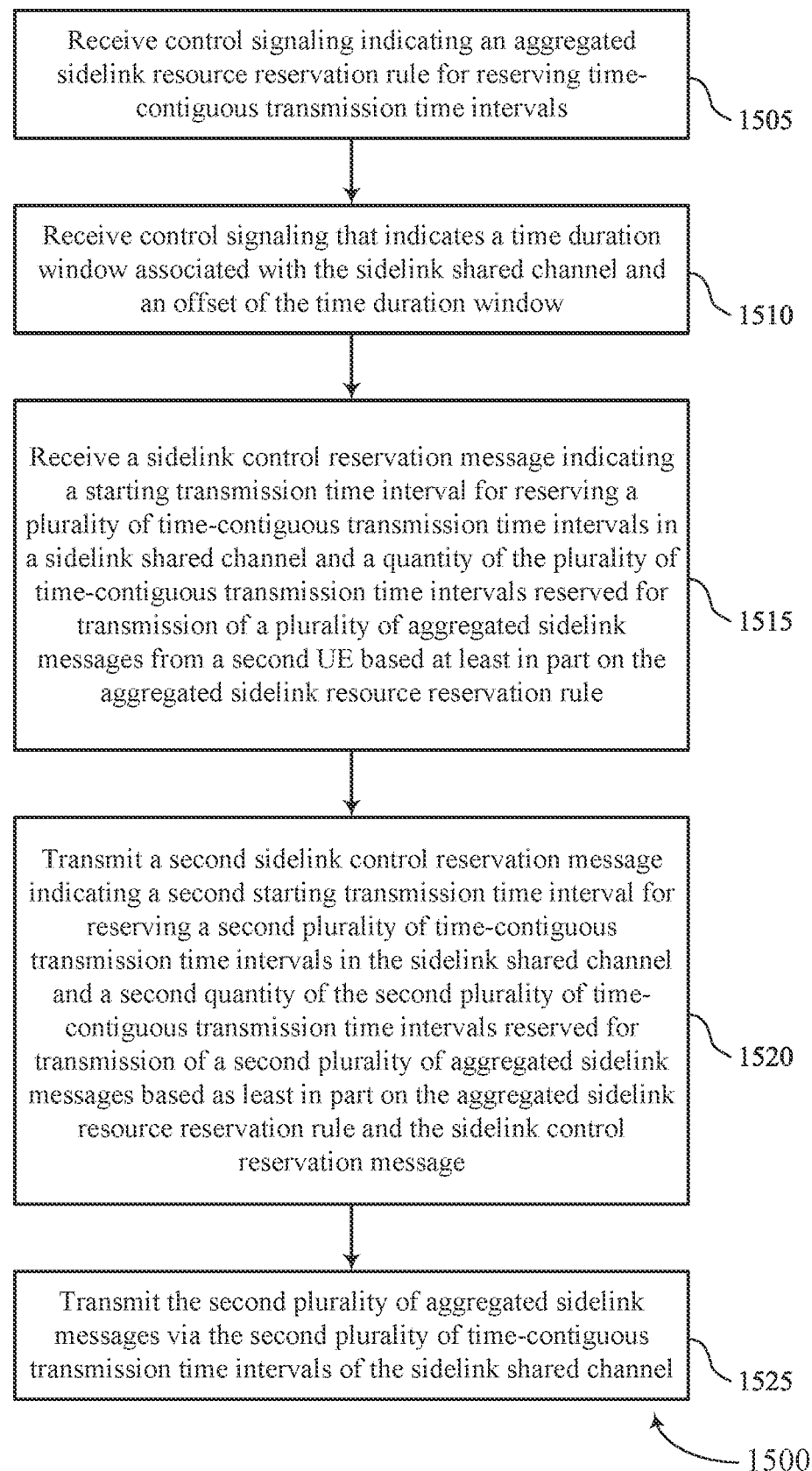

FIG. 15 shows a flowchart illustrating a method 1500 that supports reservation techniques for aggregated sidelink communications in accordance with aspects of the present disclosure. The operations of the method 1500 may be implemented by a UE or its components as described herein. For example, the operations of the method 1500 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1505, the method may include receiving control signaling indicating an aggregated sidelink resource reservation rule for reserving time-contiguous transmission time intervals. The operations of 1505 may be performed in accordance with examples as disclosed herein. In some examples, aspects of the operations of 1505 may be performed by a rule component 1025 as described with reference to FIG. 10.

At 1510, the method may include receiving control signaling that indicates a time duration window associated with the sidelink shared channel and an offset of the time duration window. The operations of 1510 may be performed in accordance with examples as disclosed herein. In some examples, aspects of the operations of 1510 may be performed by a control signal component 1045 as described with reference to FIG. 10.

At 1515, the method may include receiving a sidelink control reservation message indicating a starting transmission time interval for reserving a set of multiple time-contiguous transmission time intervals in a sidelink shared channel and a quantity of the set of multiple time-contiguous transmission time intervals reserved for transmission of a set of multiple aggregated sidelink messages from a second UE based on the aggregated sidelink resource reservation rule. The operations of 1515 may be performed in accordance with examples as disclosed herein. In some examples, aspects of the operations of 1515 may be performed by a reservation component 1030 as described with reference to FIG. 10.

At 1520, the method may include transmitting a second sidelink control reservation message indicating a second starting transmission time interval for reserving a second set of multiple time-contiguous transmission time intervals in the sidelink shared channel and a second quantity of the second set of multiple time-contiguous transmission time intervals reserved for transmission of a second set of multiple aggregated sidelink messages based as least in part on the aggregated sidelink resource reservation rule and the sidelink control reservation message. The operations of 1520 may be performed in accordance with examples as disclosed herein. In some examples, aspects of the operations of 1520 may be performed by a second reservation component 1040 as described with reference to FIG. 10.

At 1525, the method may include transmitting the second set of multiple aggregated sidelink messages via the second set of multiple time-contiguous transmission time intervals of the sidelink shared channel. The operations of 1525 may be performed in accordance with examples as disclosed herein. In some examples, aspects of the operations of 1525 may be performed by an aggregated message component 1035 as described with reference to FIG. 10.

The following provides an overview of aspects of the present disclosure:

Aspect 1: A method for wireless communications at a UE, comprising: receiving control signaling indicating an aggregated sidelink resource reservation rule for reserving time-contiguous TTIs; transmitting, based at least in part on the aggregated sidelink resource reservation rule, a sidelink control reservation message indicating a starting TTI for reserving a plurality of time-contiguous TTIs in a sidelink shared channel and a quantity of the plurality of time-contiguous TTIs reserved for transmission of a plurality of aggregated sidelink messages; and transmitting the plurality of aggregated sidelink messages via the plurality of time-contiguous TTI of the sidelink shared channel indicated in the sidelink control reservation message.

Aspect 2: The method of aspect 1, further comprising: receiving control signaling that indicates a time duration window associated with the sidelink shared channel and an offset for the time duration window.

Aspect 3: The method of aspect 2, wherein transmitting the sidelink control reservation message comprises: transmitting the sidelink control reservation message indicating the starting TTI within the time duration window relative to the offset.

Aspect 4: The method of aspect 3, wherein transmitting the plurality of aggregated sidelink messages comprises: transmitting the plurality of aggregated sidelink messages within the time duration window relative to the starting TTI.

Aspect 5: The method of any of aspects 1 through 4, further comprising: transmitting the sidelink control reservation message that comprises a quantity of bits selected based at least in part on the starting TTI and the quantity of the plurality of time-contiguous TTIs.

Aspect 6: The method of aspect 5, wherein the quantity of bits is selected based at least in part on the quantity of the plurality of time-contiguous TTIs satisfying a threshold.

Aspect 7: The method of any of aspects 1 through 6, further comprising: transmitting a second sidelink control reservation message indicating a first sidelink message of the plurality of aggregated sidelink messages.

Aspect 8: The method of aspect 7, wherein the sidelink control reservation message comprises an indication that the sidelink control reservation message is associated with the second sidelink control reservation message.

Aspect 9: The method of any of aspects 7 through 8, wherein the aggregated sidelink resource reservation rule indicates that the sidelink control reservation message is associated with the second sidelink control reservation message.

Aspect 10: The method of any of aspects 1 through 9, further comprising: transmitting the sidelink control reservation message that indicates the starting TTI; and transmitting a second sidelink control reservation message indicating an ending TTI of the plurality of time-contiguous TTIs, wherein a difference between the starting TTI and the ending TTI indicates the quantity of the plurality of time-contiguous TTIs.

Aspect 11: The method of any of aspects 1 through 10, further comprising: transmitting the sidelink control reservation message that indicates the starting TTI and the quantity of the plurality of time-contiguous TTIs with respect to a current TTI index in which the sidelink control reservation message is transmitted in a periodic resource.

Aspect 12: The method of any of aspects 1 through 11, further comprising: transmitting the sidelink control reservation message that comprises an indication that the starting TTI and the quantity of the plurality of time-contiguous TTIs are respective to a TTI index of one of a periodic resource or a dynamic resource.

Aspect 13: The method of any of aspects 1 through 12, wherein receiving the control signaling further comprises: receiving the control signaling indicating the aggregated sidelink resource reservation rule that indicates a rule for calculating the starting TTI, the quantity of the plurality of time-contiguous TTIs, or both, based at least in part on a configured offset, a time duration window, or both.

Aspect 14: The method of any of aspects 1 through 13, wherein receiving the control signaling further comprises: receiving the control signaling indicating the aggregated sidelink resource reservation rule that indicates a rule for calculating the starting TTI, the quantity of the plurality of time-contiguous TTI, or both, based at least in part on a periodic resource pool.

Aspect 15: A method for wireless communications at a UE, comprising: receiving control signaling indicating an aggregated sidelink resource reservation rule for reserving time-contiguous TTIs; receiving a sidelink control reservation message indicating a starting TTI for reserving a plurality of time-contiguous TTIs in a sidelink shared channel and a quantity of the plurality of time-contiguous TTIs reserved for transmission of a plurality of aggregated sidelink messages from a second UE based at least in part on the aggregated sidelink resource reservation rule; transmitting a second sidelink control reservation message indicating a second starting TTI for reserving a second plurality of time-contiguous TTIs in the sidelink shared channel and a second quantity of the second plurality of time-contiguous TTIs reserved for transmission of a second plurality of aggregated sidelink messages based as least in part on the aggregated sidelink resource reservation rule and the sidelink control reservation message; and transmitting the second plurality of aggregated sidelink messages via the second plurality of time-contiguous TTIs of the sidelink shared channel.

Aspect 16: The method of aspect 15, further comprising: receiving control signaling that indicates a time duration window associated with the sidelink shared channel and an offset of the time duration window.

Aspect 17: The method of aspect 16, wherein transmitting the second sidelink control reservation message comprises: transmitting the second sidelink control reservation message indicating the starting TTI within the time duration window relative to the offset.

Aspect 18: The method of aspect 17, wherein transmitting the second plurality of aggregated sidelink messages comprises: transmitting the second plurality of aggregated sidelink messages within the time duration window relative to the starting TTI.

Aspect 19: The method of any of aspects 15 through 18, further comprising: transmitting the second sidelink control reservation message that comprises a quantity of bits selected based at least in part on the starting TTI and the quantity of the second plurality of time-contiguous TTIs.

Aspect 20: The method of aspect 19, wherein the quantity of bits is selected based at least in part on the quantity of the second plurality of time-contiguous TTIs satisfying a threshold.

Aspect 21: The method of any of aspects 15 through 20, further comprising: transmitting a third sidelink control reservation message indicating a first sidelink message of the second plurality of aggregated sidelink messages.

Aspect 22: The method of aspect 21, wherein the second sidelink control reservation message comprises an indication that the second sidelink control reservation message is associated with the third sidelink control reservation message.

Aspect 23: The method of any of aspects 21 through 22, wherein the aggregated sidelink resource reservation rule indicates that the second sidelink control reservation message is associated with the third sidelink control reservation message.

Aspect 24: The method of any of aspects 15 through 23, further comprising: receiving the sidelink control reservation message that indicates the starting TTI; and receiving a third sidelink control reservation message indicating an ending TTI of the plurality of time-contiguous TTIs, wherein a difference between the starting TTI and the ending TTI indicates the quantity of the plurality of time-contiguous TTIs.

Aspect 25: The method of any of aspects 15 through 24, further comprising: transmitting the second sidelink control reservation message that indicates the starting TTI and the quantity of the transmitting plurality of time-contiguous TTIs with respect to a current TTI index in which the second sidelink control reservation message is transmitted in a periodic resource.

Aspect 26: The method of any of aspects 15 through 25, further comprising: transmitting the second sidelink control reservation message that comprises an indication that the starting TTI and the quantity of the plurality of time-contiguous TTIs are respective to a TTI index of one of a periodic resource or a dynamic resource.

Aspect 27: The method of any of aspects 15 through 26, wherein receiving the control signaling further comprises: receiving the control signaling indicating the aggregated sidelink resource reservation rule that indicates a rule for calculating the second starting TTI, the quantity of the second plurality of time-contiguous TTI, or both, based at least in part on a configured offset, a time duration window, or both.

Aspect 28: The method of any of aspects 15 through 27, wherein receiving the control signaling further comprises: receiving the control signaling indicating the aggregated sidelink resource reservation rule that indicates a rule for calculating the second starting TTI, the quantity of the second plurality of time-contiguous TTIs, or both, based at least in part on a periodic resource pool.

Aspect 29: An apparatus for wireless communications at a UE, comprising a processor; memory coupled with the processor; and instructions stored in the memory and executable by the processor to cause the apparatus to perform a method of any of aspects 1 through 14.

Aspect 30: An apparatus for wireless communications at a UE, comprising at least one means for performing a method of any of aspects 1 through 14.

Aspect 31: A non-transitory computer-readable medium storing code for wireless communications at a UE, the code comprising instructions executable by a processor to perform a method of any of aspects 1 through 14.

Aspect 32: An apparatus for wireless communications at a UE, comprising a processor; memory coupled with the processor; and instructions stored in the memory and executable by the processor to cause the apparatus to perform a method of any of aspects 15 through 28.

Aspect 33: An apparatus for wireless communications at a UE, comprising at least one means for performing a method of any of aspects 15 through 28.

Aspect 34: A non-transitory computer-readable medium storing code for wireless communications at a UE, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    receiving control signaling indicating an aggregated sidelink resource reservation rule for reserving time-contiguous transmission time intervals;
    transmitting, based at least in part on the aggregated sidelink resource reservation rule, a sidelink control reservation message indicating a starting transmission time interval for reserving a plurality of time-contiguous transmission time intervals in a sidelink shared channel and a quantity of the plurality of time-contiguous transmission time intervals reserved for transmission of a plurality of aggregated sidelink messages;
    transmitting the plurality of aggregated sidelink messages via the plurality of time-contiguous transmission time intervals of the sidelink shared channel indicated in the sidelink control reservation message; and
    receiving a second sidelink control reservation message indicating a second starting transmission time interval for reserving a second plurality of time-contiguous transmission time intervals in the sidelink shared channel and a second quantity of the second plurality of time-contiguous transmission time intervals from a second UE based at least in part on the aggregated sidelink resource reservation rule and the sidelink control reservation message.

2. The method of claim 1, further comprising:
    receiving control signaling that indicates a time duration window associated with the sidelink shared channel and an offset for the time duration window.

3. The method of claim 2, wherein transmitting the sidelink control reservation message comprises:
    transmitting the sidelink control reservation message indicating the starting transmission time interval within the time duration window relative to the offset.

4. The method of claim 3, wherein transmitting the plurality of aggregated sidelink messages comprises:
    transmitting the plurality of aggregated sidelink messages within the time duration window relative to the starting transmission time interval.

5. The method of claim 1, further comprising:
    transmitting the sidelink control reservation message that comprises a quantity of bits selected based at least in part on the starting transmission time interval and the quantity of the plurality of time-contiguous transmission time intervals.

6. The method of claim 5, wherein the quantity of bits is selected based at least in part on the quantity of the plurality of time-contiguous transmission time intervals satisfying a threshold.

7. The method of claim 1, further comprising:
    transmitting a second sidelink control reservation message indicating a first sidelink message of the plurality of aggregated sidelink messages.

8. The method of claim 7, wherein the sidelink control reservation message comprises an indication that the sidelink control reservation message is associated with the second sidelink control reservation message.

9. The method of claim 7, wherein the aggregated sidelink resource reservation rule indicates that the sidelink control reservation message is associated with the second sidelink control reservation message.

10. The method of claim 1, further comprising:
    transmitting the sidelink control reservation message that indicates the starting transmission time interval; and
    transmitting a second sidelink control reservation message indicating an ending transmission time interval of the plurality of time-contiguous transmission time intervals, wherein a difference between the starting transmission time interval and the ending transmission time interval indicates the quantity of the plurality of time-contiguous transmission time intervals.

11. The method of claim 1, further comprising:
    transmitting the sidelink control reservation message that indicates the starting transmission time interval and the quantity of the plurality of time-contiguous transmission time intervals with respect to a current transmission time interval index in which the sidelink control reservation message is transmitted in a periodic resource.

12. The method of claim 1, further comprising:
    transmitting the sidelink control reservation message that comprises an indication that the starting transmission time interval and the quantity of the plurality of time-contiguous transmission time intervals are respective to a transmission time interval index of one of a periodic resource or a dynamic resource.

13. The method of claim 1, wherein receiving the control signaling further comprises:
    receiving the control signaling indicating the aggregated sidelink resource reservation rule that indicates a rule for calculating the starting transmission time interval, the quantity of the plurality of time-contiguous transmission time intervals, or both, based at least in part on a configured offset, a time duration window, or both.

14. The method of claim 1, wherein receiving the control signaling further comprises:

receiving the control signaling indicating the aggregated sidelink resource reservation rule that indicates a rule for calculating the starting transmission time interval, the quantity of the plurality of time-contiguous transmission time intervals, or both, based at least in part on a periodic resource pool.

15. A method for wireless communications at a user equipment (UE), comprising:
receiving control signaling indicating an aggregated sidelink resource reservation rule for reserving time-contiguous transmission time intervals;
receiving a sidelink control reservation message indicating a starting transmission time interval for reserving a plurality of time-contiguous transmission time intervals in a sidelink shared channel and a quantity of the plurality of time-contiguous transmission time intervals reserved for transmission of a plurality of aggregated sidelink messages from a second UE based at least in part on the aggregated sidelink resource reservation rule;
transmitting a second sidelink control reservation message indicating a second starting transmission time interval for reserving a second plurality of time-contiguous transmission time intervals in the sidelink shared channel and a second quantity of the second plurality of time-contiguous transmission time intervals reserved for transmission of a second plurality of aggregated sidelink messages based as least in part on the aggregated sidelink resource reservation rule and the sidelink control reservation message; and
transmitting the second plurality of aggregated sidelink messages via the second plurality of time-contiguous transmission time intervals of the sidelink shared channel.

16. The method of claim 15, further comprising:
receiving control signaling that indicates a time duration window associated with the sidelink shared channel and an offset of the time duration window.

17. The method of claim 16, wherein transmitting the second sidelink control reservation message comprises:
transmitting the second sidelink control reservation message indicating the second starting transmission time interval within the time duration window relative to the offset.

18. The method of claim 17, wherein transmitting the second plurality of aggregated sidelink messages comprises:
transmitting the second plurality of aggregated sidelink messages within the time duration window relative to the second starting transmission time interval.

19. The method of claim 15, further comprising:
transmitting the second sidelink control reservation message that comprises a quantity of bits selected based at least in part on the second starting transmission time interval and the second quantity of the second plurality of time-contiguous transmission time intervals.

20. The method of claim 19, wherein the quantity of bits is selected based at least in part on the second quantity of the second plurality of time-contiguous transmission time intervals satisfying a threshold.

21. The method of claim 15, further comprising:
transmitting a third sidelink control reservation message indicating a first sidelink message of the second plurality of aggregated sidelink messages.

22. The method of claim 21, wherein the second sidelink control reservation message comprises an indication that the second sidelink control reservation message is associated with the third sidelink control reservation message.

23. The method of claim 21, wherein the aggregated sidelink resource reservation rule indicates that the second sidelink control reservation message is associated with the third sidelink control reservation message.

24. The method of claim 15, further comprising:
receiving the sidelink control reservation message that indicates the starting transmission time interval; and
receiving a third sidelink control reservation message indicating an ending transmission time interval of the plurality of time-contiguous transmission time intervals, wherein a difference between the starting transmission time interval and the ending transmission time interval indicates the quantity of the plurality of time-contiguous transmission time intervals.

25. The method of claim 15, further comprising:
transmitting the second sidelink control reservation message that indicates the second starting transmission time interval and the second quantity of the second plurality of time-contiguous transmission time intervals with respect to a current transmission time interval index in which the second sidelink control reservation message is transmitted in a periodic resource.

26. The method of claim 15, further comprising:
transmitting the second sidelink control reservation message that comprises an indication that the second starting transmission time interval and the second quantity of the second plurality of time-contiguous transmission time intervals are respective to a transmission time interval index of one of a periodic resource or a dynamic resource.

27. The method of claim 15, wherein receiving the control signaling further comprises:
receiving the control signaling indicating the aggregated sidelink resource reservation rule that indicates a rule for calculating the second starting transmission time interval, the second quantity of the second plurality of time-contiguous transmission time intervals, or both, based at least in part on a configured offset, a time duration window, or both.

28. The method of claim 15, wherein receiving the control signaling further comprises:
receiving the control signaling indicating the aggregated sidelink resource reservation rule that indicates a rule for calculating the second starting transmission time interval, the second quantity of the second plurality of time-contiguous transmission time intervals, or both, based at least in part on a periodic resource pool.

29. An apparatus for wireless communications at a user equipment (UE), comprising:
a processor;
memory coupled with the processor; and
instructions stored in the memory and executable by the processor to cause the apparatus to:
receive control signaling indicating an aggregated sidelink resource reservation rule for reserving time-contiguous transmission time intervals;
transmit, based at least in part on the aggregated sidelink resource reservation rule, a sidelink control reservation message indicating a starting transmission time interval for reserving a plurality of time-contiguous transmission time intervals in a sidelink shared channel and a quantity of the plurality of time-contiguous transmission time intervals reserved for transmission of a plurality of aggregated sidelink messages;
transmit the plurality of aggregated sidelink messages via the plurality of time-contiguous transmission time intervals of the sidelink shared channel indicated in the sidelink control reservation message; and receive a second sidelink control reservation message indicating a second starting transmission time interval for reserving a second plurality of time-contiguous transmission time intervals in the sidelink shared channel and a second quantity of the second plurality of time-contiguous transmission time intervals from a second UE based at least in part on the aggregated sidelink resource reservation rule and the sidelink control reservation message.

30. An apparatus for wireless communications at a user equipment (UE), comprising:
a processor;
memory coupled with the processor; and
instructions stored in the memory and executable by the processor to cause the apparatus to:
receive control signaling indicating an aggregated sidelink resource reservation rule for reserving time-contiguous transmission time intervals;
receive a sidelink control reservation message indicating a starting transmission time interval for reserving a plurality of time-contiguous transmission time intervals in a sidelink shared channel and a quantity of the plurality of time-contiguous transmission time intervals reserved for transmission of a plurality of aggregated sidelink messages from a second UE based at least in part on the aggregated sidelink resource reservation rule;
transmit a second sidelink control reservation message indicating a second starting transmission time interval for reserving a second plurality of time-contiguous transmission time intervals in the sidelink shared channel and a second quantity of the second plurality of time-contiguous transmission time intervals reserved for transmission of a second plurality of aggregated sidelink messages based as least in part on the aggregated sidelink resource reservation rule and the sidelink control reservation message; and
transmit the second plurality of aggregated sidelink messages via the second plurality of time-contiguous transmission time intervals of the sidelink shared channel.

* * * * *